(12) United States Patent
Umphreys et al.

(10) Patent No.: US 10,476,972 B2
(45) Date of Patent: Nov. 12, 2019

(54) USER PRESENCE DETERMINATION

(71) Applicant: GOOGLE LLC, Mountain View, CA (US)

(72) Inventors: Taylor Keith Umphreys, Menlo Park, CA (US); Siddhant Bhargava, Redwood City, CA (US); Benjamin Jerming Chang, San Jose, CA (US); Brian Keith Hales, Sandy, UT (US); Steven Alexander Hales, Palo Alto, CA (US); Craig Thomas Rohe, San Francisco, CA (US); Thomas Joseph Gurka, San Francisco, CA (US)

(73) Assignee: Google LLC, Mountain View, CA (US)

( * ) Notice: Subject to any disclaimer, the term of this patent is extended or adjusted under 35 U.S.C. 154(b) by 456 days.

(21) Appl. No.: 15/136,672

(22) Filed: Apr. 22, 2016

(65) Prior Publication Data
US 2016/0323393 A1    Nov. 3, 2016

Related U.S. Application Data

(60) Provisional application No. 62/151,830, filed on Apr. 23, 2015.

(51) Int. Cl.
*H04L 29/08*      (2006.01)
*G06Q 10/04*      (2012.01)

(52) U.S. Cl.
CPC .............. *H04L 67/18* (2013.01); *G06Q 10/04* (2013.01); *H04L 67/22* (2013.01)

(58) Field of Classification Search
CPC .......... H04L 67/18; H04L 67/22; G06Q 10/04
USPC .......................................................... 709/220
See application file for complete search history.

(56) References Cited

U.S. PATENT DOCUMENTS

| | | | |
|---|---|---|---|
| 2013/0052946 A1 | 2/2013 | Chatterjee et al. | |
| 2014/0070959 A1* | 3/2014 | Bhargava ................. | H04Q 9/00 340/870.07 |

* cited by examiner

*Primary Examiner* — Tauqir Hussain
(74) *Attorney, Agent, or Firm* — Kilpatrick Townsend & Stockton LLP

(57) ABSTRACT

Methods, systems, and apparatus, including computer programs encoded on computer storage media, for presence determination. One of the methods includes for one or more user devices having one or more associated users, determining a current location of a user, wherein the current location is associated with a particular space of a plurality of different spaces, wherein the determining includes: computing a plurality of location results, wherein each location result is computed using a distinct process of a plurality of processes; and evaluating the plurality of location results to determine a current space of the user; wherein the determining is performed by one or more of, a particular user device, a terminal device, or a server system.

21 Claims, 16 Drawing Sheets

USER PRESENCE DETERMINATION

CROSS-REFERENCE TO RELATED APPLICATIONS

This application claims the benefit under 35 U.S.C. § 119(e) of the filing date of U.S. Patent Application No. 62/151,830, which was filed on Apr. 23, 2015, and which is incorporated here by reference.

BACKGROUND

This specification relates to detecting a user's current location, identity, direction they are headed, and time it takes to get to desired location within a plurality of spaces, particularly for the use of home, office, and other uses for automation.

SUMMARY

In general, one innovative aspect of the subject matter described in this specification can be embodied in methods that include the actions of, for one or more user devices having one or more associated users, determining a current location of a user, wherein the current location is associated with a particular space of a plurality of different spaces, wherein the determining includes: computing a plurality of location results, wherein each location result is computed using a distinct process of a plurality of processes; and evaluating the plurality of location results to determine a current space of the user, wherein the determining is performed by one or more of, a particular user device, a terminal device, or a server system.

Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. In particular, one embodiment includes all the following features in combination. Determining the current location of the user includes obtaining a plurality of data points. The method further includes performing calibration for the plurality of different spaces prior to obtaining the plurality of data points. The determining is based on votes generated for the location result computed for each of the plurality of processes. In response to determining the current location is a space of the plurality of spaces that has not been calibrated, mapping the space.

Each process of the plurality of processes is trained, and wherein the training includes comparing a location of a user computed using a particular process with a location of the user computed using a baseline process. Each process of the plurality of processes is associated with a particular weight, wherein the weight is determined based on a confidence of the computed location of the process determining during the training. The training includes monitoring one or more of RSSI data and accelerometer data for a user device. A process of the plurality of processes comprises generating scan tables of RSSI values between terminal devices over time. Changes in the scan tables provide an indication that the calibration is incorrect due to movement of one or more terminal devices.

A process of the plurality of processes comprises tracking user device movement in a space to predict whether the user device is going to leave the space. In response to a determination that the user device in a space is not moving includes initiating one or more low power modes for the process. A process of the plurality of processes comprises detecting signal dampening that exceeds a threshold value and using the detected signal dampening to provide an offset to a baseline process for determining user device location. User device orientation is used to interpret signal dampening. Training the process includes performing machine learning to understand a relationship between user device orientation and how it effects incoming RSSI data. A process of the plurality of processes comprises using proximity and motion detectors to provide a vote on the location of a user when the user device is not present. One or more of the processes include a reactive specification that determines which user device of a plurality of user devices to provide a vote for as the location of a user. The determination of the current user location is performed on one or more of the user device, a remote server in communication with the user device, or one or more terminal devices located in respective spaces of the plurality of spaces.

The method includes adjusting one or more settings of one or more terminal devices based on the determination of the current location of the user. The method further includes in response to determining the space corresponding to the current user location, establishing a connection with one or more terminal devices in the space; and presenting information on the user device indicating equipment coupled to respective terminal devices that are closest to the location of the user. The determined current location is used to determine a predicted change from one space to another space.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
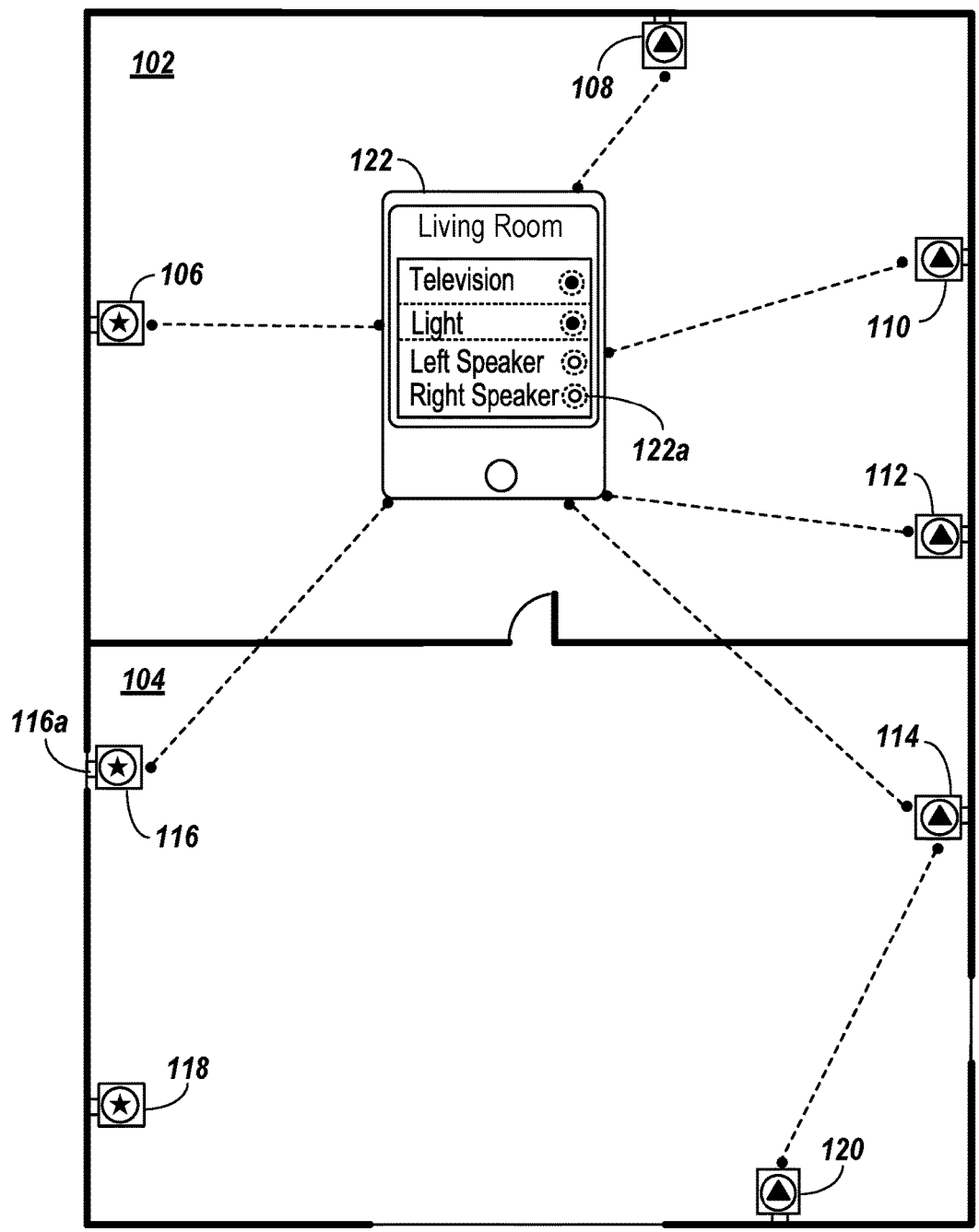
FIG. 1 illustrates example communication of a user device with terminal devices in two example spaces.

A user device can be a smartphone, tablet computer, smart-watch, other wearable computing devices, or any wireless radio emitting device. Actions can include wirelessly receiving, by a particular one of the terminal devices, a communication from the user device wherein the communication includes settings for a respective piece of equipment associated with one of the terminal devices. A terminal device can include, but is not limited to, smartplugs, lights, appliances, LED bulbs, thermostats, locks, security devices, conference phones, blinds, apps, speakers, and medical devices.

The user device uses a form of computation that analyzes a series of data points to detect a user's location within a plurality of spaces. The user device can receive these data points through a multitude of methods, including but not limited to, wirelessly receiving data from a terminal device, computing sensor information embedded within a user device, or receiving information through a connection to the internet or server.

There are multiple forms and combinations of techniques or processes the user device may perform, including forms of learning techniques, lag and reactive techniques, and mathematic probability techniques, to compute a user location based on obtained data points. Lag techniques refer to techniques that receive a stream of data channels and compare current values with past values to monitor significant changes in the data stream, resulting in a delayed vote. Reactive techniques refer to techniques that make decisions based on real time data streams, resulting in immediate votes.

A presence engine is defined as a real time system that can perform one or more of the above techniques and provide a final decision on which space a user device is located based on the information received. Each technique performed by the presence engine has the potential of providing a vote with an associated level of confidence and weight to each vote. A vote manager within the presence engine has an understanding of the different data streams and their weighted vote with the weighted vote's correlation with time, and makes a computation about which space a user device is located within.

Each technique passively learns and trains itself. The training includes comparing a generated vote with a baseline technique to develop a confidence level of the accuracy of the vote. Once the confidence level exceeds a certain threshold, the technique, which can take the form of either a lag or reactive technique, then can submit a corresponding vote to the vote manager and begin to effect the selection of the space of the user. The voting allows for multiple processes to run in parallel to determine user location, where each process can have its own weight in determining the outcome of the voting. This can increase reliability of the location detection and reduce the likelihood of a wrong location being detected.

To retrieve the first set of data points for use by the various techniques, a particular form of calibration can occur.

Method 1 for calibration requires a multiple terminal devices that lie within multiple spaces and one or more user devices within a location.

An initial calibration is facilitated by the user, in which the user walks around a particular spaces with a user device for a period of time, thereby collecting data points that include but are not limited to RSSI values (Received Signal Strength Indicator) from terminal devices to the user device, accelerometer, gyroscope, GPS, motion/step sensors on the user device. The required user path could include, but is not limited to, walking from the center of the room to one wall or boundary, walking back to the center of the room, and then repeating this process until every boundary has been covered by the process.

Method 2 for calibration includes the user standing in selective points in the particular space that include, but are not limited to, a center point in the space, all doorways to the space, particular points for a user that could include a couch, bed, nightstand, etc. This process could also require the user to stand in one position and rotate 360 degrees around while collecting these data points.

Method 3 for calibration includes the user putting a plurality of terminal devices in the particular space. The devices are able to calibrate themselves through a process of scanning and detecting their reference from other terminal devices, user devices, and a number of other data points that includes but is not limited to ambient light sensors, motion sensors, occupancy sensors, picture/video data points, etc.

After performing one or more of these calibration steps for the particular space, the user would repeat for every space of the multiple spaces within a location.

After calibration is complete for the multiple spaces, a model is generated that can run on, but not limited to, a user device, terminal device, or internet connected server.

Data samples from terminal devices are received through a beacon manager (which runs on the user device and/or terminal device) in the form of advertising packets at a specified sample rate and are processed and passed to the presence network. An advertising packet is a technique for broadcasting a small amount of data at a certain frequency so that other devices in range can scan and receive such information without having to make an active connection with the device. Such data can include, but is not limited to, a service identifier, network identifier, device address, device status, room location, name, energy usage, flags or asynchronous event notifications, and any other instantaneous data from a device. The beacon manager scans through all in-range advertising packets without making active connections, sifts through the data in the advertising packets, and passes along to the presence network.

The presence network collects data from the user device that includes but is not limited to location of terminal devices, names of terminal devices, names of spaces, number of spaces, number of networks, names of networks, number of user devices, names of user devices, RSSI between terminal devices, accelerometer data, gyroscope data, GPS, calibration data, etc. The presence network collects this data as well as all samples received and processed by the beacon manager, then organizes, parses, and passes the information to the presence engine. The presence engine creates a temporal structure that contains the present sample at time zero, along with all the samples acquired for some time in the past.

The baseline process works as a lag technique so that it can compare current values with past values to monitor significant changes in the data stream, signifying potential changes in the user's location. Each monitored change in the data stream also has an associated confidence level based on comparisons between the calibration data set, which is used in conjunction to verify if there is a change in the user's location. This data runs in a circular structure so that old data is thrown out after some time. This data stream is shared among the baseline process as well as additional methods within the system.

Since the baseline process provides a lag vote, the baseline process is voting for a time in the past, not at time zero (present time). This results in the baseline process providing improved accuracy with its vote, but results in a potential delay for the vote of when a user device enters a new space. The baseline process can never provide a false positive, although a vote of negative does not result in an absolute negative.

In the event a user is in a space that is not calibrated, or outside the entirety of the plurality of spaces, the user device can infer that it is not located in any space, and therefore is outside all known spaces at the current time. If the user is not located in a space that has been calibrated by the user, the information can be used to detect that and to map out the new space.

While the presence engine is responsible for passing an absolute yes to the system of which space a user device is in, additional passive learning techniques are used to improve accuracy, reliability and responsiveness of the system of the processes.

Sensors from the user device, such as accelerometer, GPS, gyroscope, motion detector, etc., are passively monitored from the user device and used to create learning models for specific users, user patterns, paths, home layout, etc., and over time building higher value in their voting strength.

The learning techniques, as well as the baseline process, are each given votes to pass to the vote manager. Each vote is weighted with a specific value based on the specific technique used to provide the vote. The weighting of the vote from each technique is on a scale of [−1.0:1.0]. The weight given to each technique's vote is based on a confidence level assigned to the particular technique's ability to accurately detect a user's change in location. The weighting of each technique can frequently change based on the comparison of the decision made according to the technique with the decision made according to the baseline process over a certain amount of time.

One example of a learning technique could include, but is not limited to, monitoring how many steps it takes for a user to walk from one space to another space, as validated by the baseline process. After a certain amount of events that a user repeats this path, the learning technique could pass a vote based on the number of steps a user takes to reach the boundary of the new space, and immediately pass a vote to the presence engine that signifies a change in the space location. Accelerometer sensor data from the user device can be used alone or in combination with RF signals to determine the user movement. Monitoring the number of steps that a user walks allows the process to understand the rough physical size of the space. It also allows the process to become more predictive, if it detects that the user is walking, and getting closer to a transition from one space to another.

An example would include a user waking up in the morning every day for a week, and walking out to the kitchen to make breakfast. If the learning technique detects that it requires five steps to make it from the bed to the door to the kitchen over this period of time, the technique output could submit a vote that the user has changed location to the kitchen based on taking five steps.

A second method is a reactive technique that leverages a "nearest neighbor" regression classification that detects the nearest terminal device to the user device to create a more responsive space transition. The reactive technique passively detects the nearest terminal device over a period of space transitions, learns how the change can be more responsively detected leveraging this data, and then submits a vote to the presence engine at the optimal point of transition.

An example of this would include having a terminal device in the bedroom and a terminal device in the living room. When the user device is detected as being in the bedroom, it reads with a degree of variance that the terminal device in the bedroom has a significantly lower RSSI value than the terminal device in the living room, and the opposite effect when the user is located in the living room. The output of the reactive technique provides a vote when it detects with a significant degree of variance that one terminal device has a lower RSSI value than the other terminal device.

A third method is self organizing map that could work as either a reactive or lag technique. The terminal devices receive updated scan tables of the RSSI values between all visible terminal devices, and provide those scan tables to the user device at a certain frequency. Scan tables are aggregated data sets that are collected by scanning for the advertising packets of all in-range devices and creating a relational data set that associates an RSSI value with a terminal device. By understanding the relationship of the RSSI value between each terminal device, the user device can build a reference to its own relationship between the layout of terminal devices and spaces, creating a relative mapping of the spaces.

An example of this would be the user device receives scan tables that show terminal devices in the living room are closest to terminal devices in the office, and furthest from terminal devices in the bedroom. Likewise it receives scan tables from the terminal devices in the office that show the distance between terminal devices in the bedroom and living room are relatively close to the same. Therefore, it can be assumed that if the user device is in the living room, and it is detected the user is walking, they are most likely going to enter the office next because of the office's spatial relationship to the living room.

The self organizing map also provides some additional benefits such as detecting major shifts in the scan tables over a period of time, it could infer that a change has occurred like a piece of furniture moved in front of a terminal device, or that a terminal device has moved. This would allow the user device to notify the user that a recalibration should be endured for best results. Understanding the long term changes in RF signals in a space is important for the integrity of the calibration data. For example, if the process detect that there has been a large change in the baseline RF data, it can mean that the original location of the terminal device has moved, or that other obstructions are in place. The process can determine that the calibration data is degraded and will cause a degraded level of detection, or that the calibration is just no longer valid and will force the user to recalibrate.

A fourth method is a reactive technique that detects if a user device is moving through a plurality of spaces or is not moving, therefore informing the baseline process with an understanding of if the user device is preparing to make a transition between spaces or not.

One example of this technique could include, but is not limited to, monitoring if the user device is sitting in a space A and is not moving, but as soon the user device detects motion, enables limited set of options the user is going to perform (stay in Space A, Leave Space A). The monitoring can additionally be used for power management and/or battery optimization on the user device. For example, if the user device is still, and no motion is detected through the onboard sensors the process can go into a low power mode. This can enables the user device to stay in standby mode with respect to location detection and thereby consumes the least amount of battery.

An example of this would be if a user is detected to be in the living room and is sitting on the couch not moving, unpredictable changes in RSSI values, potentially occurring from furniture moving or a large group of people entering the room, could make it look as if the user has changed rooms to the baseline process. Although, if the reactive technique detects that the user has not moved, it can ignore the decision of the baseline process. However, if the user gets up off the couch and is detected as walking, it could then inform the presence engine that a room change is possible when the baseline process detects a change in the user's location.

A fifth method is a reactive technique that passively learns potential space transitions given the current space location, therefore limiting the potential transition options for the baseline process.

Application of the fifth method could include obtaining information including potential space transitions. For example, given that a user device is in space A, the only potential space transitions could include space B and C, but not D, E, F, G, etc. This limits the potential transitions and makes the baseline process more accurate and responsive.

An example of this could include a user being located in the bedroom, which is only connected to one room, for example, the living room. Over a certain amount of days, this learning thread could detect that when a user is in the bedroom, they always make a room transition to the living room, and never the kitchen or bathroom. Therefore, when the user is moving to exit the bedroom, this learning thread to provide a high accuracy vote that the user is moving to the living room and not another room in the house, thereby limiting the choices of what room the user is entering.

A sixth method is a reactive learning technique that learns user tendencies and paths of the user device within multiple spaces and at specific times, and therefore predicts potential patterns and makes votes accordingly. The data collected could include a time based table of what room transitions a user makes at a certain time of the day, and therefore create a probability of what room a user might enter at a certain time of day. If the probability is high enough given a certain amount of repetitions of the same room transition, this learning thread could begin to submit votes with a certain vote weight at times where the user has a level of high repeatability.

One example of this reactive learning technique could include detecting that at 8 am on weekdays, a user leaves the bedroom and always walks directly into the bathroom on a regular basis, and can therefore vote when a user device begins to move around that time on a weekday that the user device is about to enter the bathroom.

A seventh method is a reactive technique that detects significant signal dampening and provides and offset to the baseline process to provide a more accurate vote. This method can also leverage other sensor data points such as a gyroscope or gravity sensor to understand the orientation of the user device. Based on the orientation of the device, the user device often sees large variations in the RSSI data streams received, and can potentially lead to false decisions of what space the user is located in. By understanding the relationship between the orientation and signal dampening effects, this method can provide a mathematical offset to the data stream received by the baseline process.

One example of this could be that when a user places a user device vertically in their pocket, a significant signal dampening is seen due to the close proximity of the user device to the user's body. By detecting the orientation of the user device and the signal dampening occurring at the same point in time, the reactive technique could offset the RSSI data stream received by the baseline process to be stronger, which would make it more easily comparable to the calibration data, and likely more accurate of a decision. In some implementations, machine learning techniques can be applied to learn the orientation of the user device and how it affects the incoming RSSI data, for more reliable location detection. For example, the raw RSSI data might represent that the user device has moved to a different space. However, if orientation of the user device is taken into account it may be able to infer that the user device is in a pocket or bag vs. being held in the hand, which may indicate, in combination with the RSSI data, that the RSSI data does not mean the user has moved to a different space.

An eighth method is a reactive technique that detects barometer change of the user device as a method of detecting what floor a user is located on, thereby limiting the potential spaces the user can be in. An example of this could include a user walking from the first floor to the second floor, and while a significant change in the barometer is occurring, the reactive technique could output a submission of a vote to the vote manager that the user is about to enter the second floor.

A ninth method is a reactive technique that receives data from terminal devices to leverage additional methods to detect location and direction a user is headed in, particularly in the case that a user does not carry the user device with them from one space to another. By using a combination of proximity and motion detectors in a specific implementation, the presence engine can compare learned data of motion patterns when walking from one space to another compared with the baseline process, and when a passing confidence level is detected, can provide a vote to the vote manager without comparison to the baseline process. Thus, since this process does not rely on the user device and RSSI data, the presence engine can determine the user location even when the user device is not kept with the user at all times.

A tenth method is a reactive technique that works as a probability mass function. This reactive technique collects a multitude of data points while switching between spaces in a plurality of spaces, and assigns these data points to the space associated with what the baseline process votes. Over time, each space has a large data set of values associated with it that are sorted by this reactive technique. When the confidence level has developed enough, this technique can start voting on real time data sets by comparing them with the previous data sets, and creating a probability percentage that they are in a certain space. This technique is also used to detect if a user is in a null space, which refers to a space that was not calibrated by a user, by noticing a very low probability that a current data set matches any of the previous calibrated data sets.

An example of this reactive technique could be that a user has 4 spaces in their home, but only 3 have been calibrated with the baseline process. After collecting additional data points over the first couple weeks of using the presence engine, this reactive technique is able to start submitting votes with thousands of data points associated with each space. In the 4th space that is not calibrated, the user device is able to detect when it is in this specific space, and therefore, is not associated with any of the calibrated spaces. It can then submit a vote saying the user device is in none of the calibrated spaces.

The presence engine also includes a block of reactive specifications that are not learning techniques, but rather settings that limit or verify certain votes received by the vote manager or data received by the baseline process.

One method of a reactive specification is if no terminal devices are detected or the wireless radio of the user device is turned off or damaged, the reactive specification can turn off voting and space detection change, and submit a vote of no longer in the network.

A second method of reactive specifications is if the accelerometer detects no movement in the user device, it could submit a vote that there is no room change possible at that time, and if movement is detected, then could submit a vote that room change is possible.

A third method of reactive specifications could signify if the user is using multiple user devices (i.e., a smartphone and a smart watch) at the same time. A reactive specification could present a vote for which user device to use at a given time for detecting the location of the user. An example could be that a user leaves their smartphone in their bedroom, then walks to the living room with a smart-watch on, this specification could switch to use the smart-watch as the current indicator for the room location instead of the smartphone. Thus, if a user has multiple user devices associated with their user account the process can determine which particular 'user device' currently represents the location of the user.

While the presence engine can run on the user device itself, the presence engine also has the possibility of running on terminal devices or on an internet connected server. In this method, the user device passes streams of data to terminal devices which can choose to run the presence engine on the device itself, or push this data stream to an internet connected server, which can make a vote and pass the vote back to the respective terminal devices.

In this method, there would be a centralized database of user preferences, patterns and learning data that can be used and accessed by multiple terminal devices and user devices at any time. The benefit of this method would be decreased computation required on user devices, allowing less resource intensive user devices to be identified as the location of the user.

Through the process of detecting the location of the user within multiple spaces, the terminal devices are enabled with the capability of adjusting to one or more settings based on the current location of the user. For example, a user can enter one space and terminal devices, such as a light, can turn on in that space or turn off when a user leaves a space to go to another. Other use cases include, but are not limited to, securing access into a space based on recognition of the user device, changing the User interface of the user device according to the current space, notifying other users of who is located within a space, and logging into a meeting or conference call based on an event in a user's calendar preferences.

In the event multiple user devices are detected in a single space where each user device is associated with a different user, the system is able to compensate for this through the following method. When a user 1 is detected in the space, their user device notifies user configured terminal devices to adjust their settings. With this command, a time value is also sent along with the desired setting, which signifies the length of time the user wants to pass after they leave the space before the device changes its setting. If User 2 enters the space when User 1 remains in the room, and then User 1 leaves the room, the time out function begins to count down. Before the timeout occurs and the settings change while User 2 is still in the room, a flag is set in the advertisement packet of the terminal devices in that space. When User 2's device detects this bit change in the advertising packet, it sends User 2's configured settings to the terminal devices in that space and the terminal devices modify their settings accordingly.

In the event a room change is detected by the presence engine, the user interface of the user device can be adjusted to notify the user of what space they are currently detected in. For example, after the space corresponding to the user location is determined, the user device can present the equipment coupled to terminal devices that are closest to the user, or those that are in the space. As a result, the UI can dynamically update based on the location of the user.

Therefore, if the user device is in a sleep mode, and is then woken up and the app is brought to the foreground, the user interface will show the user's current location with the terminal devices represented in said space. To improve the responsiveness of the user device, e.g., reduce lag time and increase efficiency of communications, sending commands to the terminal device, after determination of the space, the user device established a connection with all terminal devices shown on the user interface, even before the user selects a command to send to the terminal device. This allows for a quicker response time when the user wants to send a command, limiting the extra step of establishing a connection. If the user manually changes the space location on the user interface, the system disconnects with the terminal devices in the previous space shown on the user device, and establishes a connection with the new space shown on the user interface.

FIG. 1 illustrates example communication of a user device 122 with terminal devices in two example spaces (spaces 102 and 104). A space is one or more physical areas inside of, outside of, or both inside and outside of a home, office building, or other structure. A given physical area of a space can be adjacent to one or more other physical areas of the space. For instance, if a space comprises two physical areas, each being on a different floor or level of a building, the floors or levels can be adjacent (e.g., floors 1 and 2) or non-adjacent (e.g., floors 1 and 5). As shown in FIG. 1, space 102 comprises the physical area of the living room of a home and space 104 comprises the physical area of the bedroom of the home. Spaces can be different shapes and sizes and, in some implementations, may overlap with each other. Spaces do not need to be delineated by walls, floors or other kinds of barriers. For example, the spaces 102 and 104 could comprise a single space or a given room in a home could comprise multiple spaces.

A space can contain one or more terminal devices. For example, space 102 contains terminal devices 106, 108, 110 and 112, and space 104 contains terminal devices 114, 116, 118 and 120. A terminal device is a data processing apparatus or other device that is configured to monitor the operation or state of a piece of equipment or of an environment and, in some implementations, control the operation of the equipment. For example, a piece of equipment can be a light, an appliance (e.g., an oven, a slow cooker, a bread maker, a curling iron, and so on), a thermostat, or heating ventilation and air conditioning equipment. By way of illustration, a terminal device can turn a lamp on or off, or dim the lamp's light. Or a terminal device can monitor whether a window is open or closed, for instance. In some implementations, a terminal device includes a microprocessor, one or more radio transceivers, memory, and sensors for monitoring and/or controlling a piece of equipment. Other types of terminal devices are possible. (Terminal devices are described further in reference to FIG. 4.) Terminal devices can use their radio transceiver(s) to communicate wirelessly with user devices (e.g., user device 122), other terminal devices, and equipment that is configured to communicate wirelessly (e.g., a wireless-enabled thermostat or a wireless network hub).

Figure 3:
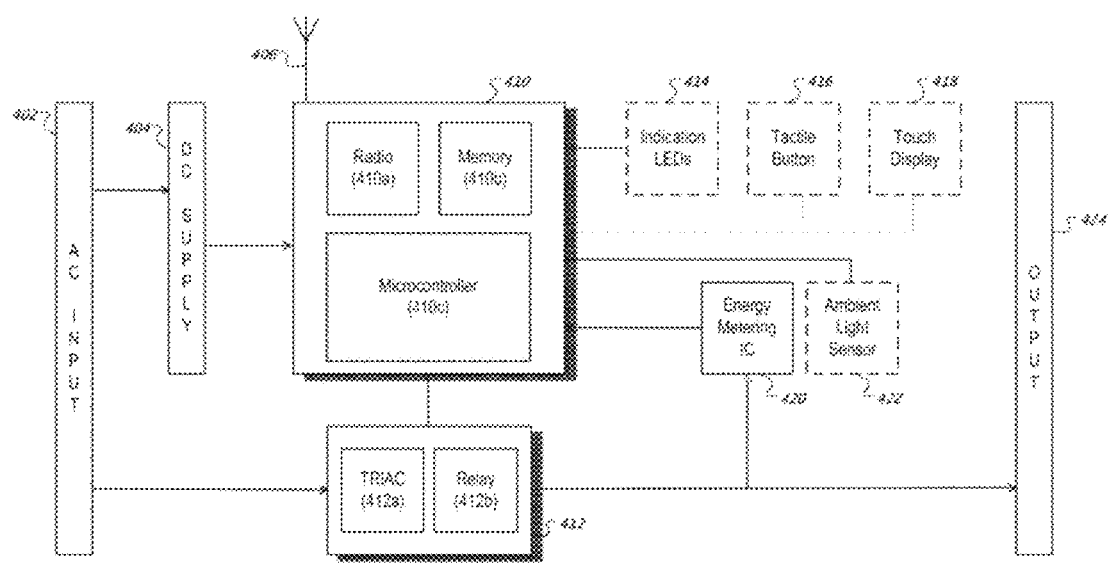
FIG. 3 illustrates components of an example terminal device.

A terminal device can be integrated into a piece of equipment (e.g., a wall socket, a light switch, a window, a door, an appliance) or can be separate device that is coupled physically or wirelessly to a piece of equipment. FIG. 3 illustrates the interior of a potential terminal device, smartplug, which includes processors and circuitry for monitoring and controlling equipment that is connected to the power receptacle.

A user device (e.g., the user device 122) is a data processing apparatus such as a smart phone, a tablet computer, a portable computer, or a wearable computing device such as a wristwatch or eye glasses, for example. Other types of user devices are possible. In various implementations, the user device 122 presents a graphical user interface (GUI) that shows equipment coupled to terminal devices in the space the user device is currently located in (e.g., the living room). Alternatively, the GUI can show equipment in a space or spaces of a user's choosing.

The GUI allows a user to monitor state and/or energy usage of equipment coupled to terminal devices and to control the equipment. For example, the GUI shows the current state of the television (on), the current state of the light (on) and the current state of the stereo speakers (off). By way of further example, if a user selected GUI control 122a for controlling the right speaker, the user device 122 would send a command packet to the terminal device 112 in response to the selection to enable (or disable) the speaker coupled to the terminal device 112. User interaction with the GUI can be through touch or keyboard input, voice input, or motion input (e.g., the user moves the user device 122 in a predetermined pattern). Other user interaction is possible.

Terminal devices make their presence known to user devices by wirelessly broadcasting what will be referred to in this specification as an advertisement packet at various times or when prompted by a broadcast message sent by a user device. In some implementations, the advertisement packet contains the transmit power of the terminal device, a terminal device identifier, status information, and a network identifier. The advertisement packet can contain fewer or additional pieces of information, however. The transmit power is a measure of the transmission power used by the transmitting radio of the terminal device. The terminal device identifier is a unique identifier for every terminal device and can be assigned to the terminal device when the terminal device is manufactured, for example. Alternatively, the terminal device identifier can be assigned to the terminal device when the terminal device is initialized (see FIG. 5). The status information indicates additional data that is available either in the advertisement packet itself or that can be requested from the terminal device. Such information can include, for example, the status of the equipment (e.g., on or off), the current dim level if the equipment is a dimmable light, information detailing the energy usage of the equipment over time, the space the device is located in, and status flags to notify additional user devices of certain information. The network identifier is assigned to the terminal device during initialization of the terminal device and indicates which user or entity initialized the terminal device. Initialization of terminal devices is described further below with reference to FIG. 5.

Figure 2:
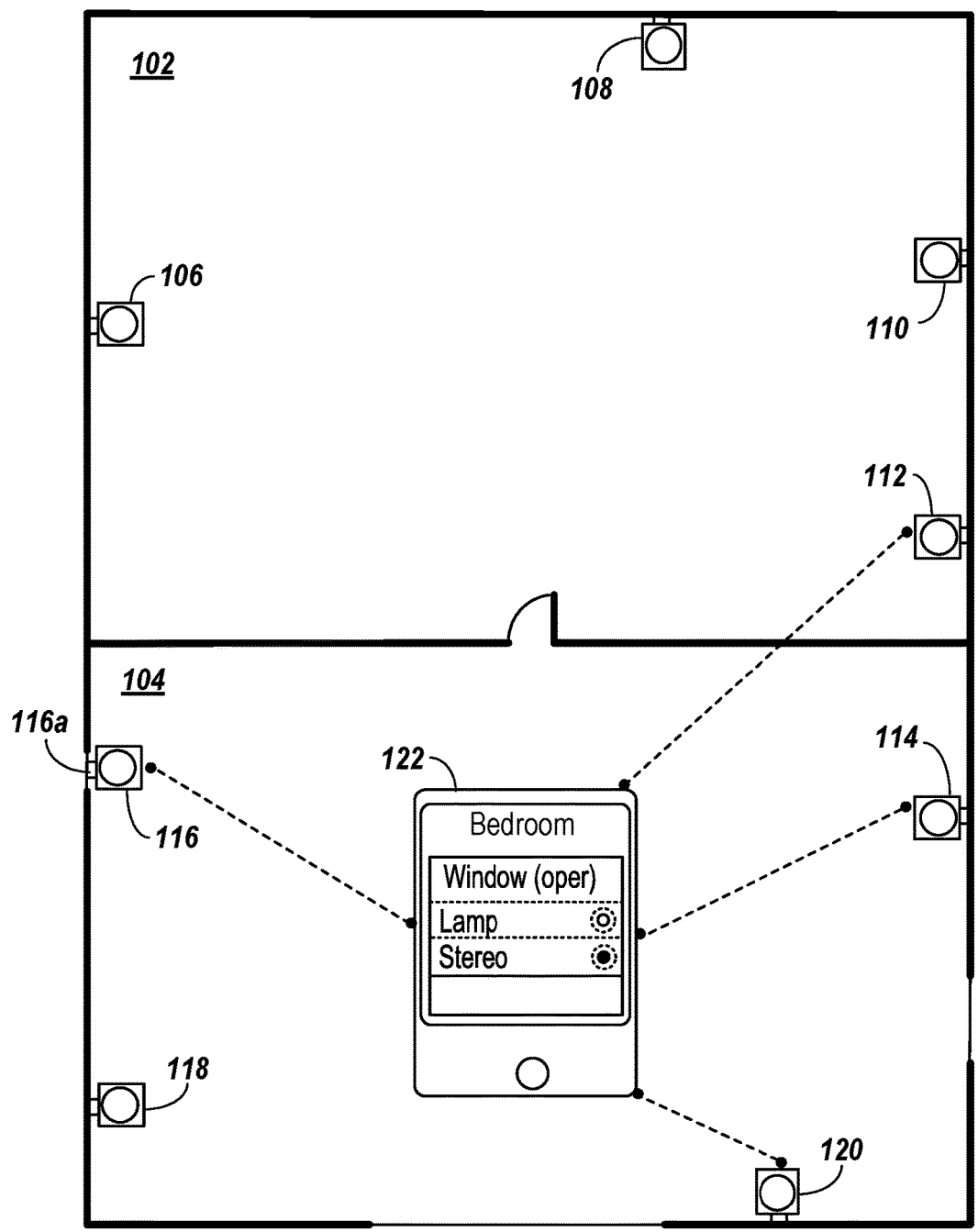
FIG. 2 illustrates example communication of a user device with terminal devices in two example spaces after the user device has roamed into a different space.

FIG. 2 illustrates example communication of a user device 122 with terminal devices in two example spaces after the user device has roamed from space 102 to space 104. The user device 122 can periodically or at other times determine its current location in order to determine whether the user device 122 is in a new location. In this example, the user device 122 receives advertisement packets from terminal device 112 in space 102 and terminal devices 114, 116 and 120 in space 104. The user device 122 uses RSSI measurements of the terminal devices, as described above, to determine that it is currently located in space 104.

When the user device determines that it is in a new location, the GUI can be changed to show equipment coupled to terminal devices in the current space (e.g., the bedroom). In this example, the GUI of user device 122 shows the current state of the window 116a (the window is open), the current state of the lamp (off) and the current state of the stereo (on). In some implementations, when a user device leaves a space the equipment in the space is disabled or put into an energy saving mode.

FIG. 3 illustrates components of an example terminal device 400. The terminal device 400 can be integrated into a smartplug, a wall outlet, a light switch, or other devices having alternating current (AC) or direct current (DC) powered circuits, for example. The terminal device 400 can contain fewer or more components than those illustrated in FIG. 3. The terminal device 400 receives AC power input (e.g., from a wall socket) and provides the input to a DC power supply 404 which, in some implementations, is a switched-mode power supply (SMPS). The DC power supply 404 incorporates a switching regulator to convert electrical power while converting voltage and current characteristics.

The output of the DC power supply 404 powers a System on a Chip (SoC) 410 which, in some implementations, comprises a microcontroller 410c, a memory 410b, and a radio transceiver 410a. The radio transceiver 410a is configured to send and receive data using the antenna 406. The radio transceiver 410a in some implementations operates at 2.4 GHz and supports the Bluetooth® low energy wireless protocol (e.g., Bluetooth® 4.0). Other frequencies (e.g., 3.6 GHz, 5 GHz, 60 GHz, etc.) and protocols (e.g., IEEE 802.11, IEEE 802.16, etc.) are possible. In further implementations, there can be more than one radio transceiver each utilizing the same or different frequency/protocol combinations. The microcontroller 410c can be a 32-bit ARM® Cortex CPU, for example. Other microcontrollers are possible. The memory 410b can include, for instance, Random Access Memory (RAM) and non-volatile Flash memory.

The hybrid AC switching circuit 412 comprises a triode for alternating current (TRIAC) 412a and a relay 412b which is an electrically operated switch controlled by the SoC 410. The TRIAC/Relay 412 controls the power output 424 which, in some implementations, powers the piece of equipment that is physically coupled to the terminal device. In further implementations, the power output 424 can be DC instead of AC and can be used to power equipment that require low voltages such as thermostats, for example. The relay 412b can also be used to drive a motor. For example, the terminal device 400 can be integrated into devices such as motorized window shade controllers and garage door openers. An energy metering Integrated Circuit (IC) 420 monitors current energy output to the equipment. Instructions executing on the microcontroller 410c can obtain energy consumption information from the energy metering IC 420 over time and store the information in the memory 410b for future reference.

In some implementations, the terminal device 400 is wirelessly coupled to a piece of equipment through the transceiver 410a. That is, the terminal device 400 using the transceiver 410a can communicate with a piece of equipment that is able to communicate wirelessly such as, for example, a wireless network enabled thermostat or a wireless network hub. In these implementations, the TRIAC/relay 412 and the energy metering IC 420 can be omitted from the terminal device 400 or be disabled.

The terminal device 400 can include one or more sensors and one or more user interface devices. For example, the terminal device 400 can include an ambient light sensor 422 that provides measurements of ambient light to the SoC 401. Instructions executed by the microcontroller 410c can use the ambient light measurement to direct the TRIAC 412a to change the power delivered to the equipment (e.g., a lamp) to adjust the light output of the lamp to compensate for the ambient light. Other sensors are possible. Additional example sensors are discussed further below in reference to FIG. 4.

The user interface devices can include, for example, one or more light emitting diodes (LEDs) 414, one or more tactile buttons 416, and a touch-sensitive display 418. For example, if terminal device 400 is integrated into a light switch, the light switch could be controlled by use of the touchscreen instead of the usual tactile toggle switch. Other user interface devices are possible.

Figure 4:
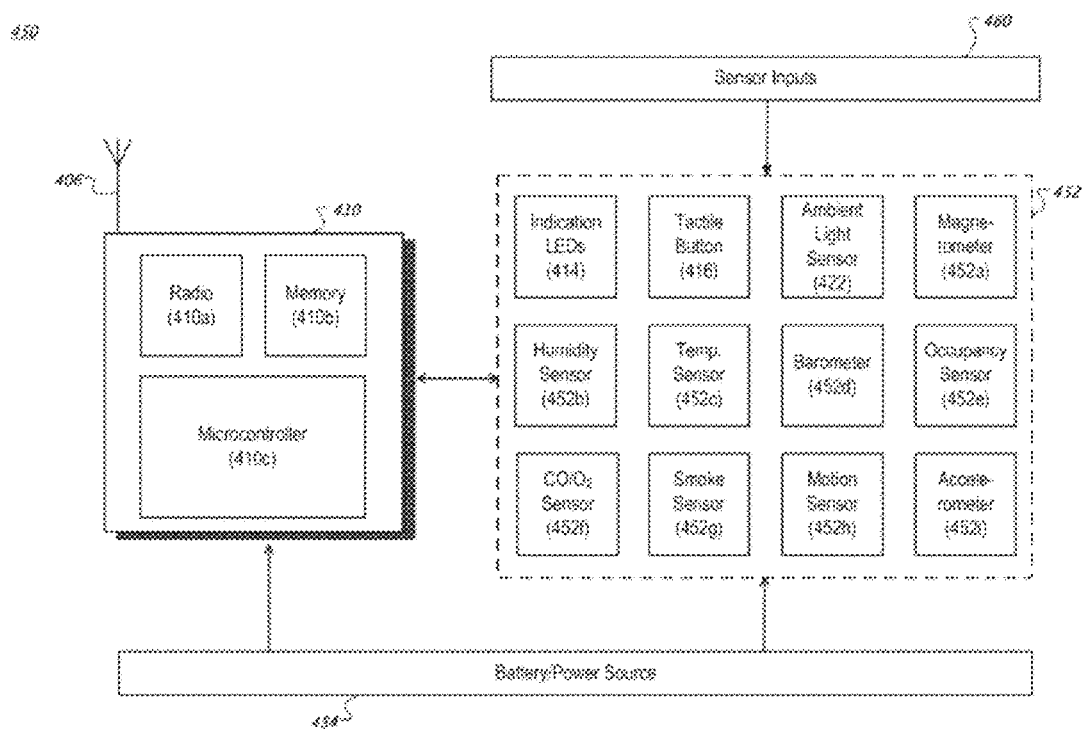
FIG. 4 illustrates components of another example terminal device.

FIG. 4 illustrates components of another example terminal device 450. The terminal device 450 can be used for monitoring objects or an environment. The terminal device 450 can be implemented as a separate device or can be integrated into another device (e.g., a thermostat). The terminal device 450 can contain fewer or more components than those illustrated in FIG. 4. The terminal device 450 receives power input 454 (AC or DC) from a battery or other source such as an AC power input (e.g., from a wall socket). If the power input is AC, the power is converted to DC.

The DC output of the power source 454 powers the SoC 410 which, in some implementations, comprises a microcontroller 410c, a memory 410b, and a radio transceiver 410a. (See FIG. 3.) The DC output of the power source 454 also powers one or more optional sensors 452. The sensors 452 provide input to the SoC 410. Instructions executed by the microcontroller 410c can use input received from the sensors and perform various functions in response. The indication LEDs 414, tactile button 416 and ambient light sensor were described above in regards to FIG. 3. The sensors can receive input from sources external to the terminal device 450 through one or more sensor inputs 460.

A magnetometer 452a measures the strength and, in some implementations, the direction of magnetic fields. The magnetometer 452a can be used to sense whether windows or doors, for example, are open or closed when the magnetometer 452a's sensor input 460 is connected to a magnet that is attached to the window or door, for example. An accelerometer 452i measures proper acceleration and can be used in conjunction with the magnetometer 452a (as a compass) to detect three-dimensional movement. A humidity sensor 452b, temperature sensor 452c, and barometer 452d measure ambient humidity, temperature, and air pressure, respectively.

Motion sensor 452h detects motion in the environment surrounding the terminal device. An occupancy sensor 452e can include an infrared sensor and a proximity sensor to determine if there are people present in a space. A carbon monoxide/carbon dioxide sensor 452f can detect the presence of CO or $CO_2$ in the air, and a smoke sensor 452g can detect the presence of smoke in the air. Air can be sampled by the sensors through an air intake input 460, for example. One or more of these sensors can be incorporated into the terminal device 400.

Figure 5:
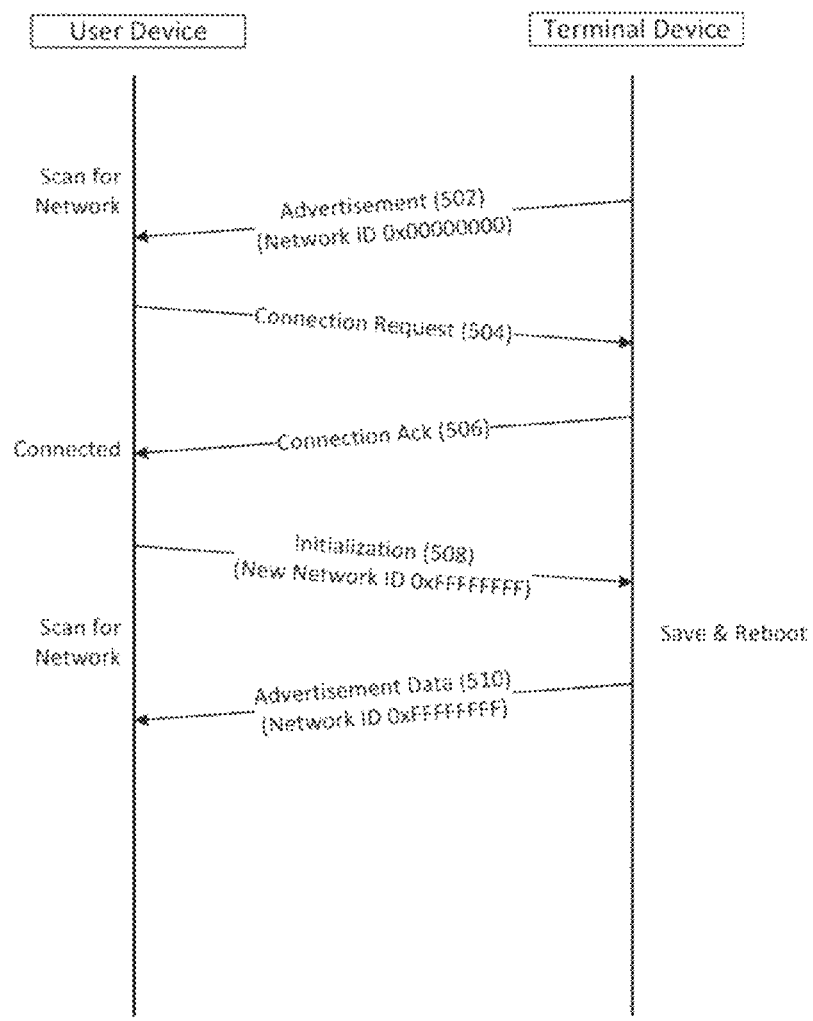
FIG. 5 illustrates an example initialization of a terminal device.

FIG. 5 illustrates an example initialization of a terminal device. To initialize a terminal device (e.g., terminal device 114), a user connects the terminal device to a power source such as a power socket and waits for their user device (e.g., user device 122) to receive an advertisement packet 502 from the terminal device. As discussed above, a terminal device makes its presence known to a user device by wirelessly broadcasting an advertisement packet 502 at various times or when prompted by a broadcast message sent by the user device. In some implementations, and as describe above, the advertisement packet 502 contains the transmit power of the terminal device, a terminal device identifier, status information, and a network identifier.

The advertisement packet in some implementations is 27 bytes in length and the network identifier comprises 32 bits of a 128 bit field. If the terminal device has not been initialized, the network identifier is set to a predefined value (e.g., 0x00000000). Otherwise, the network identifier is set to the current value of the network identifier assigned to the terminal device. In some implementations, once a network identifier has been assigned to a terminal device, the terminal device can only be controlled by user devices which have permission to use the network identifier In further implementations, communication between the user device and the terminal device can be encrypted such that only the terminal device and the user device can decrypt messages sent between them.

Once the user device receives the advertisement packet 502 from the terminal device, the user device sends a connection request packet 504 to the user device. The destination address of the connection request packet 504 is the terminal device identifier obtained from the advertisement packet. The terminal device accepts the connection request packet 504 and sends a connection acknowledgement packet 506 to the user device in response. At this point, the user device and the terminal device are connected to each other.

After the connection is established, the user device provides an initialization packet to the terminal device which contains a network identifier and, optionally, one or more optional configuration parameters. The network identifier is determined by the user device and can be unique to the user of the user device. In some implementations, each terminal device initialized by the same user will be assigned the same network identifier. In further implementations, each network identifier is associated with a user account and a password. In order to access terminal devices having a given network identifier, the user associated with the network identifier must be logged into their account. This prevents other users from changing the configuration of terminal devices once they have been initialized by a particular user.

The optional configuration parameters can include a user specified name for the equipment coupled to the terminal device (e.g., "Bedside Lamp"), the equipment type (e.g., dimmable or non-dimmable light, television, appliance), and the name of the space which the terminal device is in (e.g., "Bedroom"). Alternatively, the configuration parameters could be stored on the user device instead of the transmitting them to the terminal device. Once the terminal device receives the initialization packet 508, the terminal device sets its network identifier to be the same as the network identifier (e.g., 0xFFFFFFFF) in the initialization packet. If there are any configuration parameters in the initialization packet, the terminal devices stores these values as well. After initialization, the terminal device will advertise its newly assigned network identifier (e.g., 0xFFFFFFFF) in the advertisement packet 510.

Figure 6:
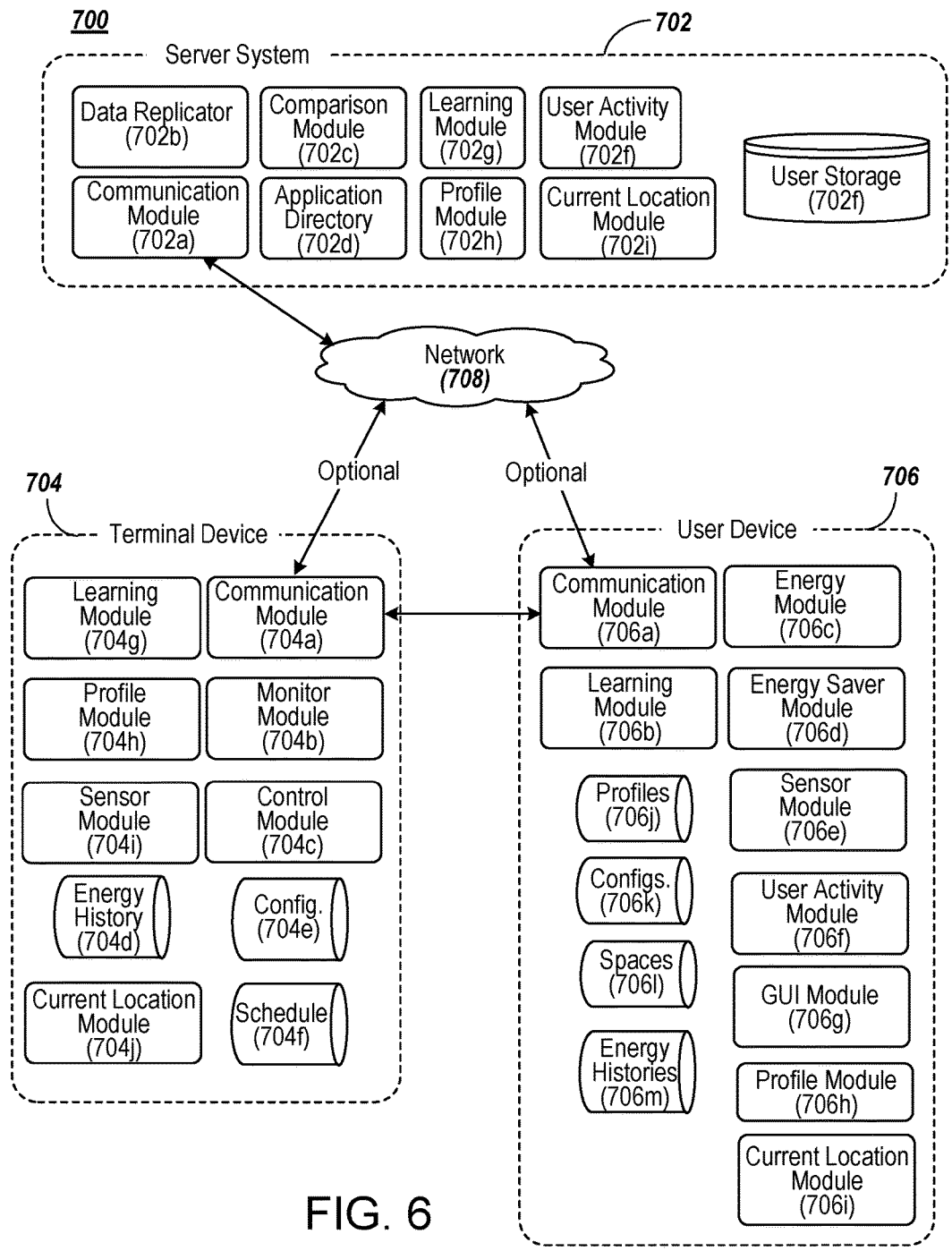
FIG. 6 is a block diagram illustrating an example system including a user device, terminal device, and cloud communication within the system.

FIG. 6 is a block diagram illustrating an example system 700 for monitoring and control of equipment on which the techniques described herein can be implemented. The system 700 includes one or more user devices 706, one or more terminal devices 704, and a server system 702.

Each user device 706 can include a communication module 706a, a learning module 706b, an energy usage module 706c, an energy saver module 706d, a sensor module 706e, a user activity module 706f, a GUI module 706g, a profile module 706h, a current location module 706i, storage for user profiles 706j, storage for equipment configurations 706k, storage for information about spaces 706l, and storage for equipment energy histories 706m. The modules 706a-i can be implemented as software, hardware or a combination of software and hardware that is executed on the user device. Fewer or more modules are possible. The storage 706j-m can be implemented as random access memory, Flash memory, or other types of persistent or non-persistent storage. There can be multiple user devices within the system at any time, and each user device can communicate and share data to both the network and terminal devices.

Each terminal device 704 can include one or more of a communication module 704a, a monitor module 704b, a control module 704c, a learning module 704g, a profile module 704h, a sensor module 704i, a current location module 704j, storage for energy history 704d, storage for the terminal device's equipment configuration settings 704e, and storage for an equipment schedule 704f. The modules 704a-c can be implemented as software, hardware or a combination of software and hardware that is executed on the terminal device. Fewer or more modules are possible. The storage 706d-f can be implemented as Flash memory, read-only memory, or other types of persistent storage.

The server system 702 can include one or more of a communication module 702a, a data replicator module 702b, a comparison module 702c, an application directory module 702d, a learning module 702g, a profile module 702h, a user activity module 702i, a current location module 702j, and storage for user data 702f. The modules 702a-d can be implemented as software, hardware or a combination of software and hardware that is executed on one or more data processing apparatus located in one or more geographic locations. Fewer or more modules are possible. The storage 702f can be implemented as random access memory, Flash memory, network accessible storage such as hard drives, or other types of persistent storage.

Network 708 can include a large computer network, examples of which include a local area network (LAN), wide area network (WAN), the Internet, a cellular network, or a combination thereof connecting a number of mobile computing devices, fixed computing devices, and server systems. The network(s) included in network 708 can provide for communications under various modes or protocols, examples of which include Transmission Control Protocol/Internet Protocol (TCP/IP), Global System for Mobile communication (GSM) voice calls, Short Electronic message Service (SMS), Enhanced Messaging Service (EMS), or Multimedia Messaging Service (MMS) messaging, Ethernet, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. Communication can occur through a radio-frequency transceiver. In addition, short-range communication can occur, e.g., using a Bluetooth®, WiFi, or other such transceiver system.

The communication module 706a in the user device 706 can communicate wirelessly with one or more terminal devices (e.g., terminal device 704) using Bluetooth®, WiFi, or another wireless-protocol. The communication module 706a of the user device 706 receives an advertisement packet 502 (FIG. 5) transmitted by the communication module 704a of the terminal device 704. The communication module 706a can respond with a connection request 504 which is received by the terminal device 704's communication module 704a. In response, the communication module 704a transmits a connection acknowledgment 506 to the user device 706 indicating that a connection between the terminal device 704 and the user device 706 has been established.

Once a connection between the terminal device 704 and the user device 706 has been established by the respective communication modules, the user device 706 can transmit a command packet or an initialization packet 508 to the terminal device 704. Regarding the former, the command packet contains one or more equipment commands for the terminal device 704 to implement immediately, such as turning equipment coupled to the terminal device on or off. The commands can be implemented by the communication module 704a or the control module 704c, for example.

Configuration information for the terminal device 704 is stored in the equipment configurations 706k storage of the user device 706 by the GUI module 706g as part of the equipment configuration. The communication module 706a retrieves the stored configuration information and transmits it as configuration parameters in an initialization packet 508 to the terminal device 704. The terminal device 704's communication module 704a receives the initialization packet 508 and provides the network identifier and configuration parameters from the initialization packet 508 to the control module 704c. The control module 704c stores the network identifier and the configuration parameters in the equipment configuration settings 704e and then controls the equipment according to the received configuration parameters. The configuration parameters can specify, for example, the equipment type, whether the equipment is dimmable (if the equipment is a light), an optional proximity configuration, and an optional timer configuration. The timer configuration is stored as a schedule for the equipment in the equipment schedule storage 704f. If a timer configuration is provided, the control module 704*c* will turn the equipment on and off according to the schedule.

The monitor module 704*b* of the terminal device 704 collects information regarding the equipment's energy usage over time and stores the information in the energy history storage 704*d*. For example, energy usage in terms of kilowatt hours (kWh) per hour per day for the last four months can be stored in the energy history storage 704*d*. The user device 706's energy usage module 706*c* can request the energy usage information from the terminal device 704 by causing the communication module 706*a* to transmit an energy history request packet to the user device 704.

The communication module 704*a* of the terminal device 704 receives the energy history request packet from the user device 706 and, in response, causes the monitor module 704*b* to retrieve the energy history information from the storage 704*d*. The monitor module 704*b* then causes the communication module 704*a* to transmit the energy history information to the user device 706. The communication module 706*a* of the user device 706 receives the energy history information from the terminal device 704 and provides it to the energy usage module 706*c*. The energy usage module 706*c* stores the received energy history information in the storage for equipment energy histories 706*m*. The storage for equipment energy histories 706*m* is used by the GUI module 706*g*, for example, to display energy history information.

The current location module 706*i* determines the current location of the user device 706 and takes appropriate action, if necessary, when a change in location is detected. The communication module 706*a* obtains RSSI values for terminal devices that it receives advertisement packets from. The communication module 706*a* provides the RSSI values to the current location module 706*i* which determines the current location as described above in regards to FIG. 1. When the current location of the user device 706 has changed to a new space, the current location module 706*i* signals the communication module 706*a* to transmit a packet announcing the presence of the user device 706 to terminal devices in the new space. In various implementations, the packet contains an identifier of the respective user device and the name of the new space. The terminal device communication modules 704*a* receive the packets and, in some implementations, save their respective equipment configurations in anticipation that the user device 706 will change the settings. The current location modules in 704 and/or 702 determines the location of the user device in the case that the user device does not contain a current location module. In this case, the terminal device and server system can receive information from multiple devices and modules, and run the current location module on the server system or the terminal devices themselves. Then, by communicating either through user devices, terminal devices or the network, can take the appropriate action, if necessary, when a change in location is detected.

The current location module 706*i* determines what pieces of equipment are assigned to the new space. The configuration(s) of the equipment assigned to the new space are gathered from the configuration storage 706*k* and scanned to determine if any of the pieces of equipment has a proximity setting enabled. If so, command packets are sent to the terminal devices coupled to those pieces of equipment to turn the equipment on or off according to the proximity settings. In further implementations, the current location module 706*i* signals the GUI module 706*g* to display the new space.

For example, if a first user device (user device 'B') has changed location to a new space but there is already a second user device (user device 'A') in the new space, one of the user devices will take priority over the other. In some implementations, the packet that announces to the terminal devices when a user device has newly entered the space contains priority information. If the priority information of user device B does not trump the priority information of user device A, then the terminal devices will ignore any command packets that user device B may transmit to the terminal devices. Otherwise, the terminal devices can save their respective equipment configurations in anticipation that user device B will change their equipment configurations. Priority among users can be established in a number of ways. If user A is a parent and user B is a child, for instance, then a rule can be established that the corresponding user device of the parent always has higher priority than the user device of the child. Or the user device that enters a space first has priority over other user devices that enter the space afterwards. Other types of rules are possible.

The user activity module 706*f* monitors user activities and, in some implementations, can perform one or more actions in response to detecting an activity of a user. An activity is, for example, watching a movie, playing an electronic game, activating a media controller, opening or closing a window or a door, adjusting a thermostat, turning an oven on or off, turning a fan on or off, or entering a bedroom after a particular time. Other types of activities are possible. The user activity module 706*f* of the user device 706 is made aware of a user activity through an activity update message that is received by the communication module 706*a* and delivered to the user activity module 706*f*. The activity update message indicates the type of activity the user is engaged in. The user activity module 702*i* can also exist in the server system, in which case the user activity module can receive certain activity actions from various terminal devices directly through the network, and can perform one or more actions in response to such activity, with or without the user device being present.

The activity update message is generated in some implementations by an application programming interface (API) on the device (e.g., a set-top box, a wireless thermostat, and so on) that detects the user activity. Received activity update messages can cause the user activity module 706*f* to perform an action such as, for instance, sending a message to the user (e.g., "the living room window is open and rain is predicted") or sending a command packet to one or more pieces of equipment to, for example, dim the lights when the user activity is watching a movie, lower motorized blinds, or raise the indoor temperature. Actions can be defined programmatically through the API or interactively through use of a graphical user interface presented on the user device, for example. In some implementations, software applications that support the activity update API are registered in the server system's 702 application directory 702*d*. The application directory 702*d* allows users to download the applications onto their user devices for adding activity-based functionality to the user device 706.

The learning module 706*b* tracks equipment usage patterns and activity patterns over time for one or more users. Tracking information for equipment usage includes tuples of the following information: <user, time, terminal device, command>, where user identifies the user and time indicates the time at which the command was sent by the user device of the user to the identified terminal device. Tracking information for activities includes tuples of the following information: <user, time, activity, space>, where user identifies the user, time indicates the time at which the user commenced the activity identified by activity, and space identifies the space in which the activity was commenced. The user device 706 can store the tracked information locally or in the server system 702. The learning modules 702g and 704g perform similar actions, and can each do so with or without a user device being present, e.g., by communicating directly through the network.

The learning module 706b can be derive patterns from the tracking information and use the patterns to automatically create timer settings (e.g., timer setting 604a) for equipment and define actions for the user activity module 706f. Patterns of equipment usage are derived for a given user by detecting that the user, at a given time of day or time range, causes a user device to transmit a particular command to a particular terminal device. For example, given the equipment usage tracking information:

<David, 5:00 PM Jan. 14, 2013, living room lamp, turn on>
<David, 5:16 PM Jan. 15, 2013, living room lamp, turn on>
<David, 4:50 PM Jan. 16, 2013, living room lamp, turn on>
<David, 5:05 PM Jan. 17, 2013, living room lamp, turn on>

A pattern for user David can be deduced from the equipment usage tracking information that specifies turning on the living room lamp each weekday at around 5:00 PM in the evening. A timer setting for the living room lamp can be created and stored as a schedule in the equipment schedule storage 704f. The control module 704c will turn the equipment on and off according to the schedule.

Patterns of activities are derived for a given user by detecting that the user device of the user, at a given time of day or time range, receives an activity update message. For example, given the equipment usage tracking information:

<Susan, 8:00 PM Jan. 14, 2013, play movie, bedroom>
<Susan, 8:22 PM Jan. 15, 2013, play movie, bedroom>
<Susan, 8:15 PM Jan. 17, 2013, play movie, bedroom>

A pattern for user Susan can be deduced from the equipment usage tracking information that specifies playing a movie in the bedroom each weekday at around 8:20 PM in the evening. An action can be automatically defined to dim lights in the bedroom at 8:20 PM each weekday.

The energy saver module 706d tracks occupancy patterns and energy usage patterns over time for one or more users. Tracking information for occupancy includes tuples of the following information: <user, entry time, exit time, space>, where user identifiers the user, entry time is the time at which the user device of the user entered the space identified by space, and exit time is the time at which the user device of the user exited the space. The occupancy tracking information can be obtained, for example, from the current location module 706i. Energy usage information includes tuples of the following information: <on time, off time, terminal device, energy usage>, where on time is the time when equipment coupled to the terminal device identified by terminal device was turned on, off time is the time when equipment coupled to the terminal device was turned off, and energy usage indicates the amount of energy (e.g., kWh) consumed by the equipment during the time period between on time and off time. The energy usage information can be obtained, for example, from the energy usage module 706c.

The energy saver module 706d can derive occupancy and energy usage patterns from the tracking information. For example, after analyzing the occupancy tuples for a given user, the energy saver module 706d determines that user David is located in the bedroom space on average from 9:30 PM-6:30 AM weekdays, and is located in the living room space from 6:45 PM-9:20 PM weekdays. Other times David is not present in any of the spaces. The energy saver module 706d can analyze the energy usage tuples to determine times when equipment is consuming power and the amount of power consumed. By way of illustration, a lamp in the bedroom space consumes power from 6:45 PM-10:00 PM weekdays, even though user David occupies the living room for the majority of this time. The energy saver module 706d can compare occupancy patterns for a given user or users with energy usage patterns for one or more pieces of equipment to identify times when equipment is consuming power in unoccupied spaces. The energy saver module 706d can notify a user through the GUI module 706g to suggest turning off equipment in unoccupied spaces to save energy. In some other implementations, the user can authorize an energy saving mode such that the lamp can be automatically turned off based on the determination from the energy saver module 706d.

Additionally, the energy saver module 706d can compare activity patterns to energy consumption to suggest turning off equipment that is not needed for the given activity. Other types of comparisons are possible, for example, comparing the energy use of equipment in a home to similar homes in the same geographic area to suggest ways to save energy. The energy saver module 706d can compare the energy usage of one user to another for the same spaces and make suggestions to the user that consumes the most power regarding how that user could alter their use of equipment to correspond to that of the other user to reduce their power consumption.

The sensor module 706e obtains measurements from various physical sensors integrated into the user device and modifies configurations of one or more pieces of equipment based on the obtained measurements. By way of example, a sensor measurement can be one or more of a measurement of motion from a motion detector sensor, a measure of ambient light from an ambient light sensor, a measurement of sound from a microphone, a measurement of ambient temperature from a thermometer, a measurement of physical location from a global positioning system, a measurement of touch from a touch-sensitive display device, a measurement of compass direction from a compass, a measurement of direction or intensity of a magnetic field from a magnetometer, a measurement of humidity from a humidity sensor, a measurement of atmospheric pressure from a barometer, a measurement of luminance from a light sensor, a measurement of orientation from an orientation sensor, or a measurement of proximity from a proximity sensor. Other measurements and sensors are possible. The sensor module 704i within a terminal device can measure various physical sensors integrated in the terminal device and modify one or more pieces of equipment based on the obtained measurements. A sensor measurement can be one or more measurement of proximity, humidity, temperature, ambient light, and motion. Other measurements and sensors are possible.

The profile module 706h manages profiles for users of the user device 706. Each user can have their own profiles. Profiles represent equipment settings for equipment in one or more spaces. When a user creates a profile (e.g., through user interaction with a GUI on the user device), the equipment settings for the profile are provided by the GUI module 706g to the profile module 706h. The profile module 706h associates the profile with the user and stores the profile in the profile storage 706j. Likewise, when a user edits a profile (e.g., through user interaction with a corresponding GUI), any changes to the equipment settings for the profile are provided by the GUI module 706g to the profile module 706h. The profile module 706h updates the profile in the profile storage 706j with the changed settings. The profile modules 702h and 704h manage profiles for users similar to 706h, although can do so directly on the terminal device or in the server system. This allows terminal devices and user devices to be authorized to access user profile preferences from a central location in the server system.

When a profile is activated (e.g., through user interaction with a corresponding GUI), the GUI module 706g requests the profile from the profile module 706h and, in turn, the profile module 706h retrieves the profile from profile storage 706j and provides it to the GUI module 706g. The GUI module 706g converts the profile to one or more commands to change settings on one or more pieces of equipment and provides the commands to the communication module 706a. The communication module 706a transmits the commands to terminal devices for the equipment and thus activates the profile.

In addition, the GUI module 706g allows users to add equipment (e.g., through user interaction with a corresponding GUI) and modify settings of the equipment. The GUI module 706g stores the settings in configuration storage 706k and, when the user wishes to edit the settings for a piece of equipment, retrieves the settings from configuration storage 706k. When settings for a piece of equipment are changed, the GUI module 706g converts the settings to one or more commands to change the settings on the piece of equipment and provides the commands to the communication module 706a. The communication module 706a transmits the commands to the terminal device for the piece of equipment.

The GUI module 706g allows users to define spaces and activate or deactivate all of the equipment in a space (e.g., through user interaction with appropriate GUIs). A space definition comprises a name and the identity of one or more terminal devices in the space. The GUI module 706g stores new space definitions in spaces storage 706l. When a user wishes to turn on or turn off all equipment in a space, the GUI module 706g generates one or more commands to send to the equipment in the space and invokes the communication module 706a to transmit the commands to the relevant terminal devices.

Finally, in addition to allowing users to create, edit and activate profiles, the GUI module 706g presents energy consumption information culled from the energy history storage 706m.

Some implementations include a server system 702. The server system 702 provides data replication and other services to terminal devices and user devices. The communication module 702a of the server system 702 can communicate wirelessly with one or more terminal devices (e.g., terminal device 704) and user devices (e.g., user device 706) using Bluetooth®, WiFi, or another wireless-protocol. The data replicator module 702b of the server system replicates data stored on terminal devices (e.g., terminal device 704), user devices (e.g., user device 706), or both. For example, the data replicator receives energy history data (e.g., energy history data 704d or 706m) from the communication module 702a, associates the data with a given user, and stores the data in user storage 702f.

The energy history data can be "pulled" by the data replicator 702b, that is, the data replicator 702b can use the communication module 702a to send requests for the data to the terminal devices and/or user devices. Alternatively, the energy history data can be "pushed" to the server system 702 by the terminal devices and/or the user devices by the respective communication modules of the devices. For example, at various times the communication module 706a of the user device 706 can send updated energy history data to the server system 702 without prompting from the server system 702. Likewise, profiles in profile storage 706b, equipment settings in configuration storage 706k, and space definitions in space definition storage 706l can be pulled from the server system 702 or pushed to the server system 702. Having this information replicated in the server system 702 allows the information to be accessed and modified from different terminal and user devices as well as other data processing apparatus.

A comparison module 702c can compare energy usage for a given user with the energy use of users in similar dwellings and provide the comparison to the user by sending a message using the communication module 702a to the user device of the user. The message can be presented to the user by the GUI module 706g, for example.

An application directory module 702d provides software applications for download to user devices for adding activity-based functionality to the user devices. The software applications are programmed to send activity update messages using the API described above in regards to the user activity module 706f Once downloaded, the programs can define actions on the user device. The application directory 702d allows users to download the applications onto their user devices.

Figure 7:
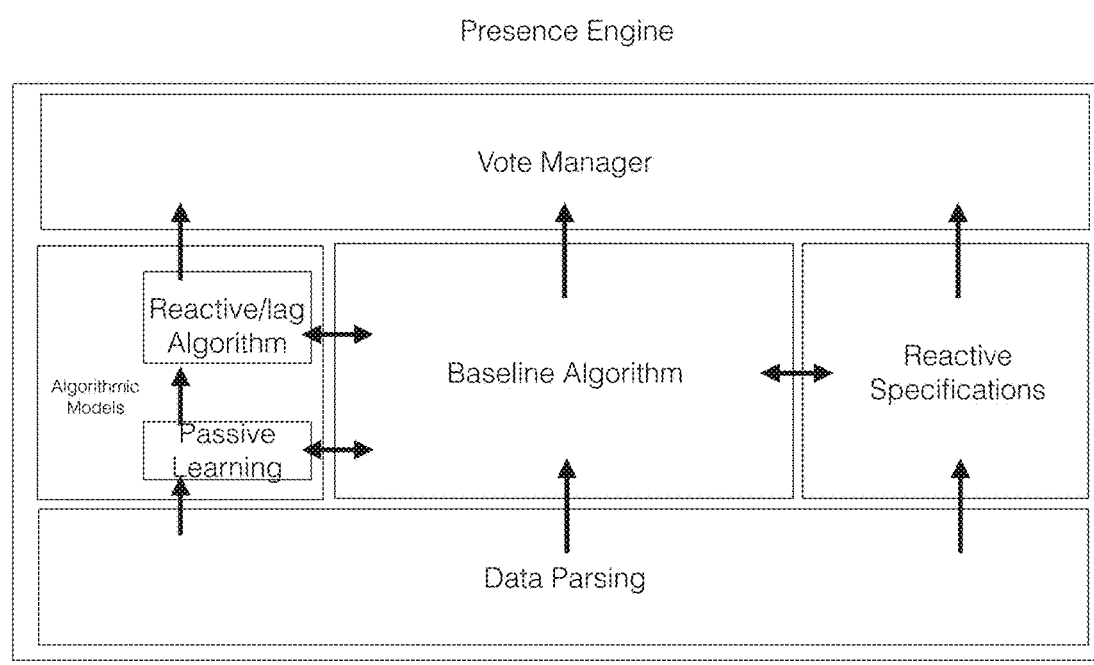
FIG. 7 illustrates the components and data transfer within a presence engine.

FIG. 7 illustrates the modules within a presence engine. A data parser receives data from the app, sensor data manager, and presence network, parses the data received, and sends them to the particular presence techniques that require that data. The baseline process takes in data from an obtained user calibration to develop an initial model that detects significant changes in the data stream and compares those changes with the calibration data to select a current room for the user. The baseline process is a lag process that provides a guaranteed yes in the system that other passive learning techniques use to improve their training and confidence level. The presence engine can contain an unlimited number of processes within the system that have the possibility of passing votes to the vote manager. Each model contains multiple components. The first is a passive learning thread that receives data from the data parsing block specific to each method's data requirements.

As the passive learning thread receives and processes data from the data stream, the passive learning thread makes "Silent" votes that don't get passed to the vote manager, but instead check the passive learning thread's validation with the baseline process. As the passive learning thread trains itself with the data and has surpassed a certain threshold percentage of correct votes vs. incorrect votes, the learning process can become a lag or reactive process in the system. When each particular learning process passes to this stage, it then has the ability to pass votes to the vote manager with a certain confidence level. This confidence level will continue to adjust by comparing the particular learning process's vote with the baseline process, and if it ever falls below a certain threshold of confidence, it will go back to the passive learning stage and lose the ability to pass votes to the vote manager. Reactive specifications are characteristics that have the ability to change settings in the presence engine and baseline process. These specifications could detect things like no network present, no accelerometer motion detected, or major change in scan tables detected and then perform actions such as disable presence engine or switch vote weight due to incomplete data for a specific algorithm. The vote manager receives votes with various weights and values from the various components of the system and makes a final decision of which space a user is located in.

Figure 8:
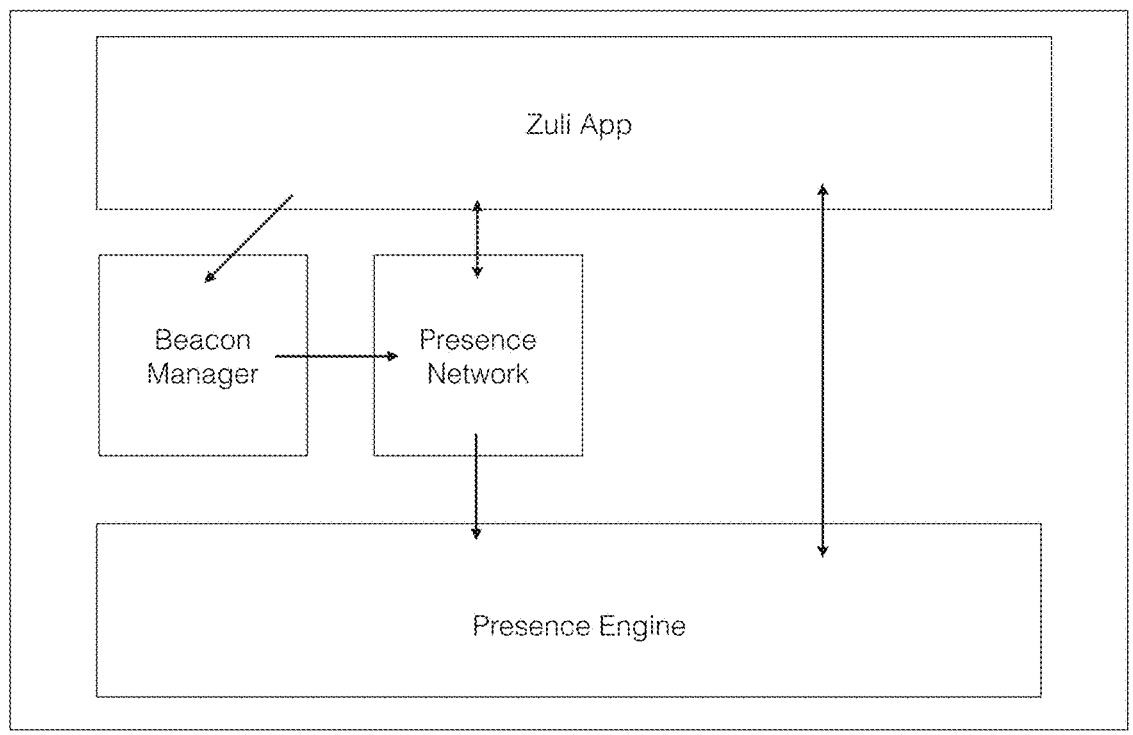
FIG. 8 illustrates the components of a user device and the communication paths between the code modules.

FIG. 8 illustrates the components of a user device and how they interact with the presence engine. A beacon manager is a component that scans and receives broadcast packets from terminal devices. The beacon manager then parses this information and passes it to a presence network. The presence network collects data from the user device that includes but is not limited to location of terminal devices, names of terminal devices, names of spaces, number of spaces, number of networks, names of networks, number of user devices, names of user devices, accelerometer data, gyroscope data, GPS, calibration data, etc. The presence network collects this data as well as all samples received and processed by the beacon manager, the present network also organizes and passes the information to the data parsing module in the presence engine.

Figure 9:
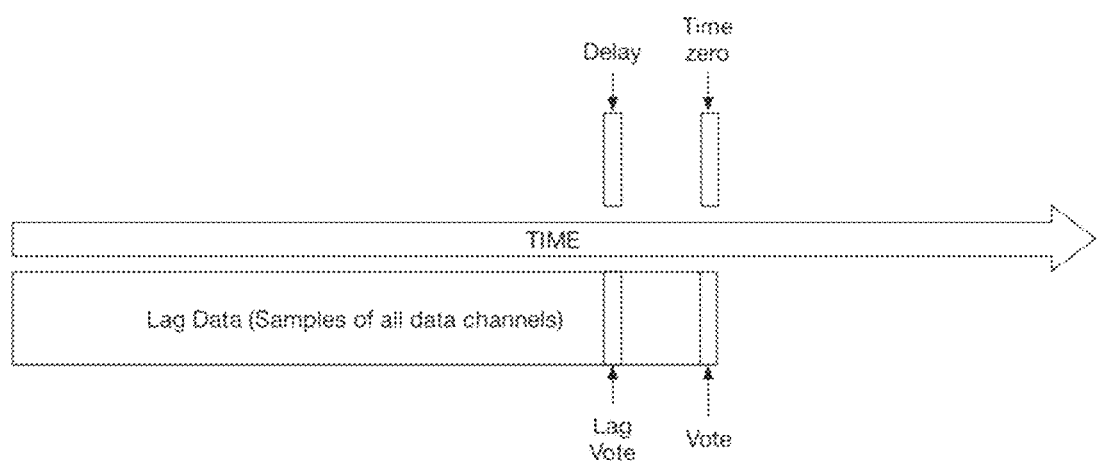
FIG. 9 illustrates the difference between a vote generated through a lag technique and a vote generated through a reactive technique.

FIG. 9 illustrates the comparison between a vote from a lag technique and a reactive technique. Lag votes are voting for a time in the past, not at Time zero, i.e., a current time. This enforces that lag techniques provide improved accuracy with their vote, but results in a potential delay for the vote of when a user device enters a new space. The baseline process is a lag technique that can never provide a false positive, although a vote of negative does not result in an absolute negative. Reactive techniques are used to improve the accuracy and responsiveness of the presence engine by providing real-time votes at time zero. While these are more immediate votes, they will have lower confidence levels than lag techniques and will therefore typically provide lower weighted votes.

Figure 10:
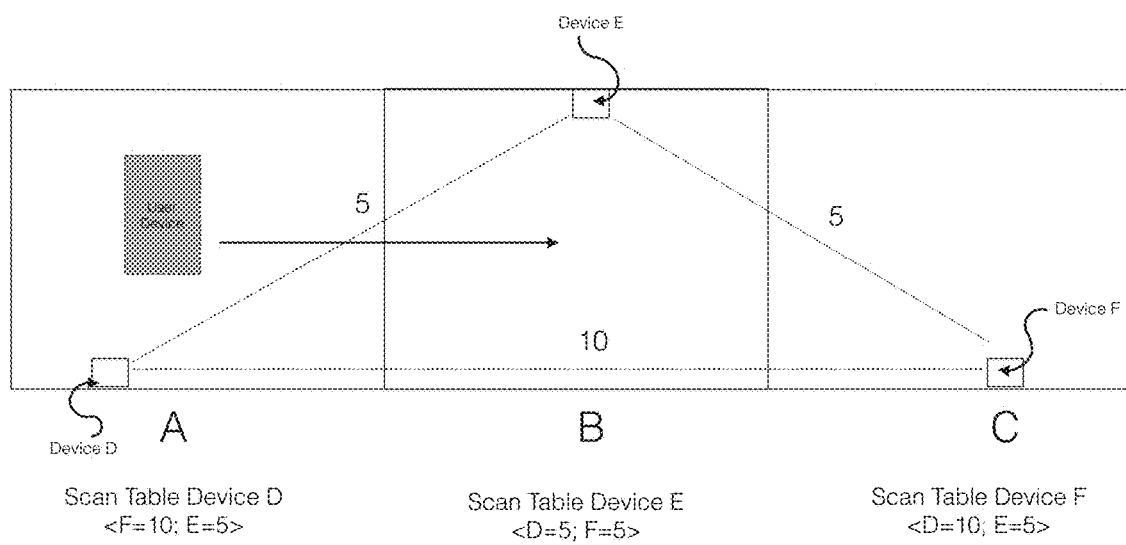
FIG. 10 illustrates an example of a self organizing map developed using the scan tables.

FIG. 10 demonstrates a self organizing map process and how scan tables can be used to create high confidence votes. In this example, the user device is located in Space A and has an understanding of RSSI values from various terminal devices in Spaces A, B, and C. FIG. 10 shows terminal device D is in room A, terminal device E is in Room B, and terminal device F is in room C. The scan tables for each terminal device show that terminal devices D and F are furthest away from each other, while terminal device E is relatively equal distance to D and F. It can then be inferred that while the user device is located in Space A, it will likely go into Space B before it go into Space C. Therefore, the user device can infer that as it detects movement and predicts an upcoming space change, it can reasonably expect the user will walk into Space B.

Figure 11:
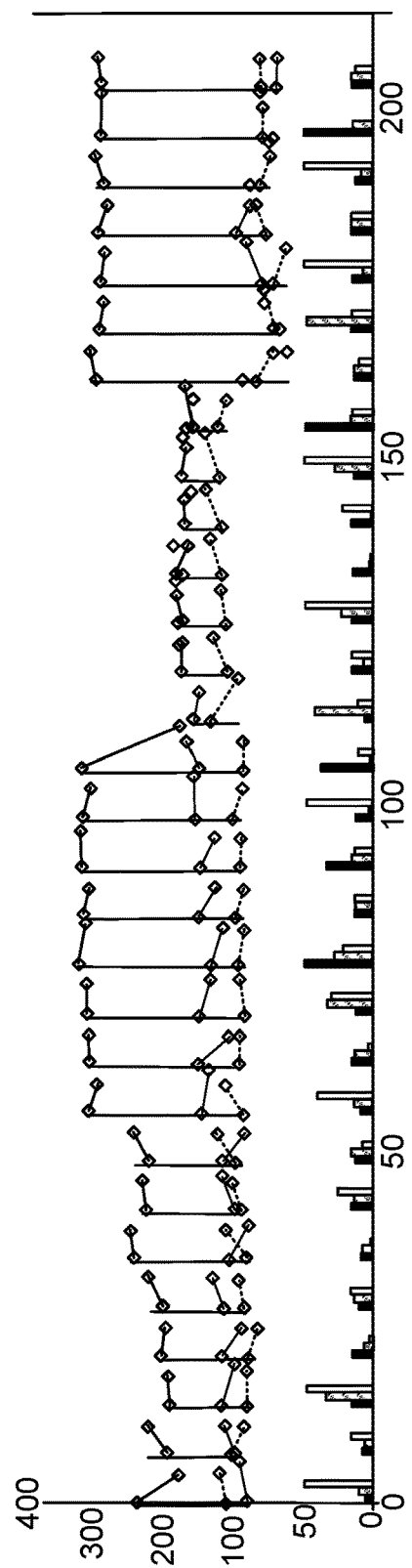
FIG. 11 is an example of data received during calibration with developing confidence levels.

FIG. 11 is a model of the calibration data received by a user device when doing an initial calibration in a space. The data points on top represent RSSI values received from 3 different terminal devices over a period of time. The bars on the bottom show the confidence level of the room as its training itself for calibration.

Figure 12:
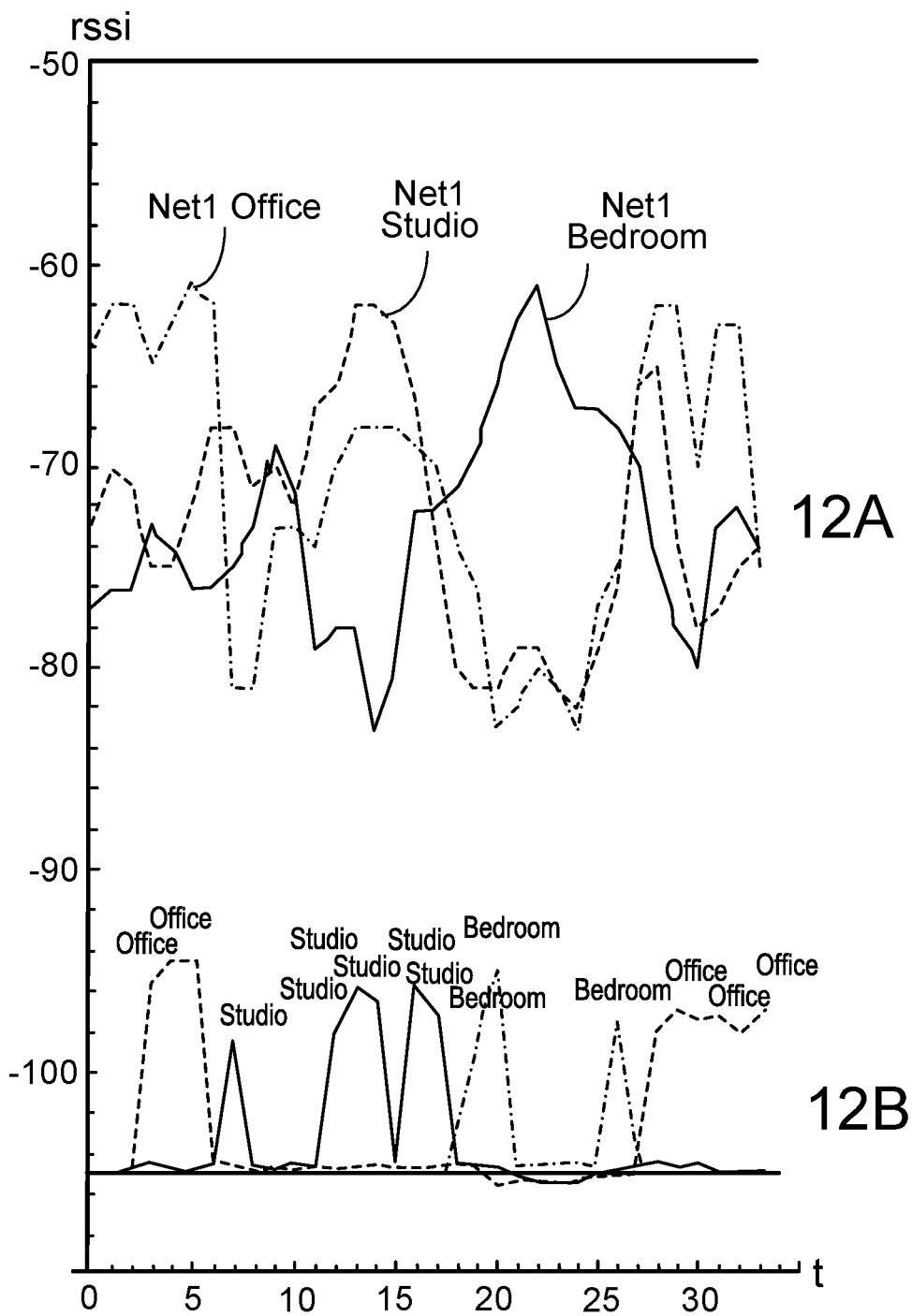
FIG. 12 is an example of data received compared with voting confidence and values.

FIG. 12 is a graph of the data streams while walking between spaces in an environment having multiple spaces. The top data points (12A) show the processed and parsed RSSI data streams that are received by the presence engine of a user device. The bottom data points (12B) show the output of the presence engine for which space it identifies the user device is located in, with a confidence level of the decision.

Figure 13:
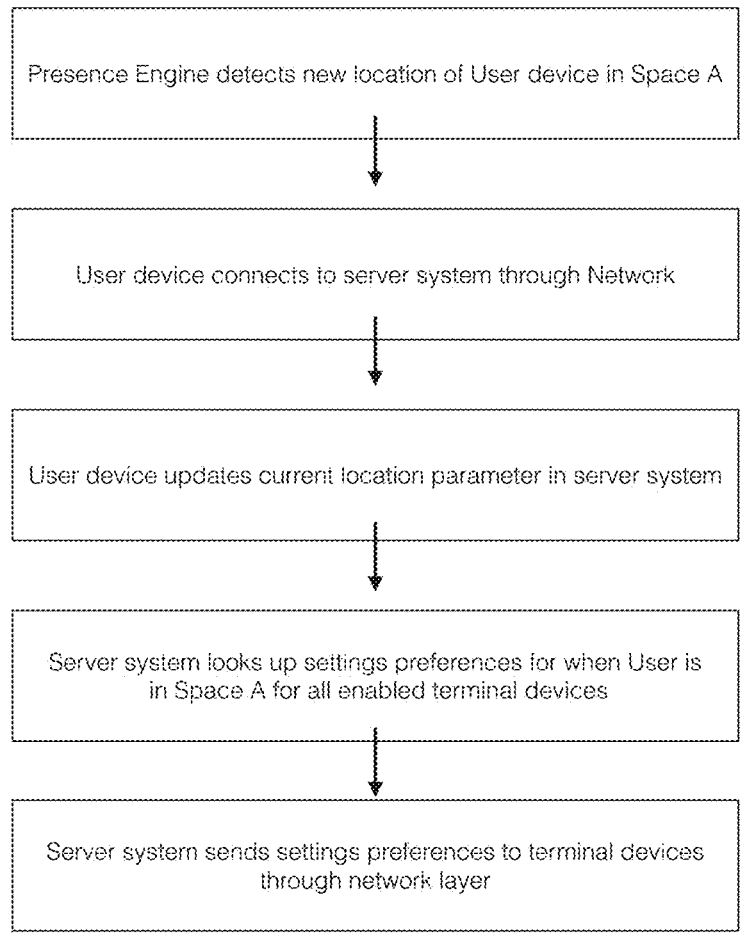
FIG. 13 illustrates a process of detecting a space change and updating an internet connected server.

FIG. 13 illustrates the process of the user device updating the user device's current location to the server system, which then updates settings to specific internet connected terminal devices through the network layer. First, the presence engine detects the user has entered a new space. The user device communicates with the server system through the network layer and updates the data point for current location of the user. Once this parameter has been changed, the server system looks up preferences for terminal devices that are associated with the space change in a data base in the server system. Then the server system communicates to the internet connected terminal devices through the network layer and sends updated settings configurations for the terminal device to change to.

Figure 14:
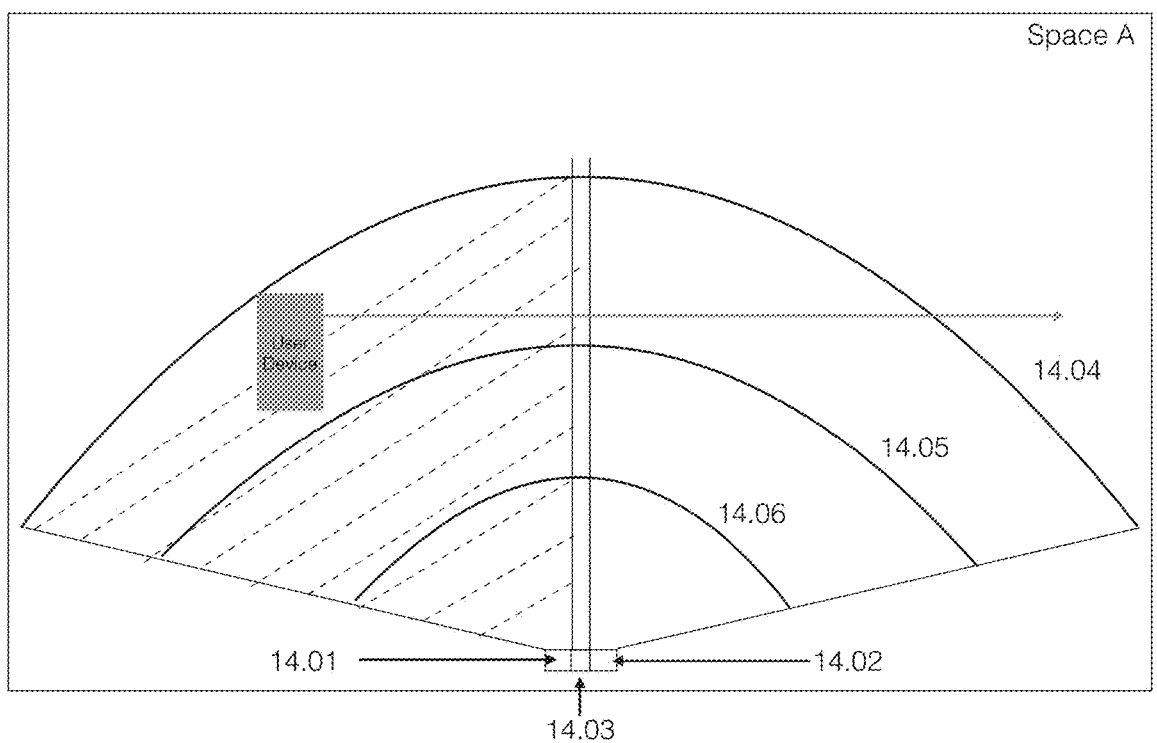
FIG. 14 illustrates an example of a terminal device using multiple sensors to detect movement and location of user within a space and determine if they are leaving the space and entering a new space.

FIG. 14 illustrates an example implementation of a terminal device that uses multiple sensors working together to detect location, direction, and predicted space changes of a user. This is a feature that can work with the presence engine to train itself and when it has built a high enough confidence, can take over user detection if a user does not have a user device with them. 14.01 and 14.02 are sensors that could include, but are not limited to, motion sensors, infrared sensors or proximity sensors. The two sensors are positioned so that their range of visibility do not overlap and together add up to 180 degrees of visibility. 14.03 is a sensor, which could include a motion sensor, infrared sensor or proximity sensor, with an understanding of depth of the object that's moving. 14.04, 14.05, and 14.06 represent regions of near, immediate, and far regions of the 14.03 sensor. The data points received from 14.01, 14.02, and 14.03 sensors are combined to create a relative XY coordinate of the motion throughout a room. By comparing this motion over a period of time with the baseline process to detect how the motion patterns identify a potential room change, the terminal device can create a level of confidence to make a vote to the vote manager even without a confirmation from the baseline process.

Figure 15:
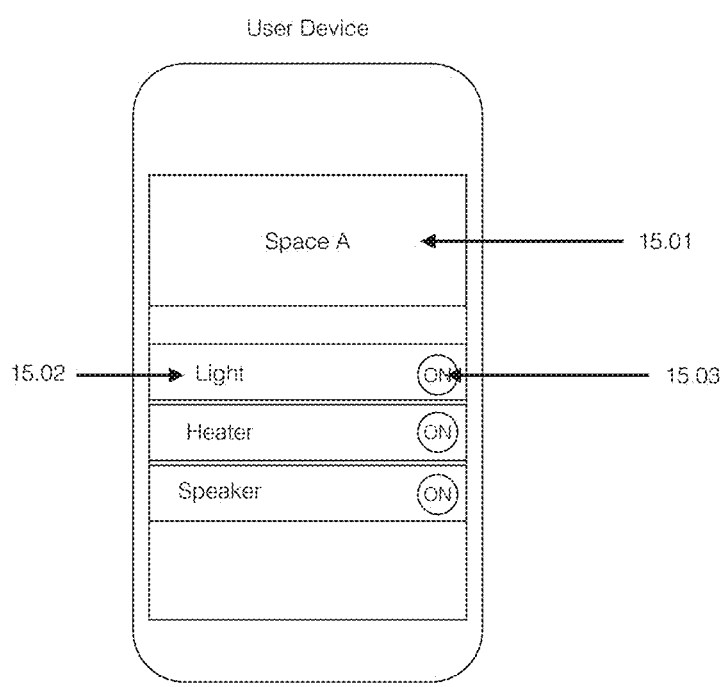
FIG. 15 illustrates an example of a user interface on a potential user device.

FIG. 15 illustrates an example of a user interface on an example user device. The user interface shows the current space a user is in, a list of terminal devices in the current space, and control options (15.03) that could include, but is not limited to, one or more of on, off, dim, play music, change temperature, close or open blinds, lock or unlock door, and play or pause movie. 15.01 illustrates the space identification, which updates real-time based on what space the user is currently in. When this updates, the corresponding list of terminal devices (15.02) updates to show the terminal devices in the current room.

Figure 16:
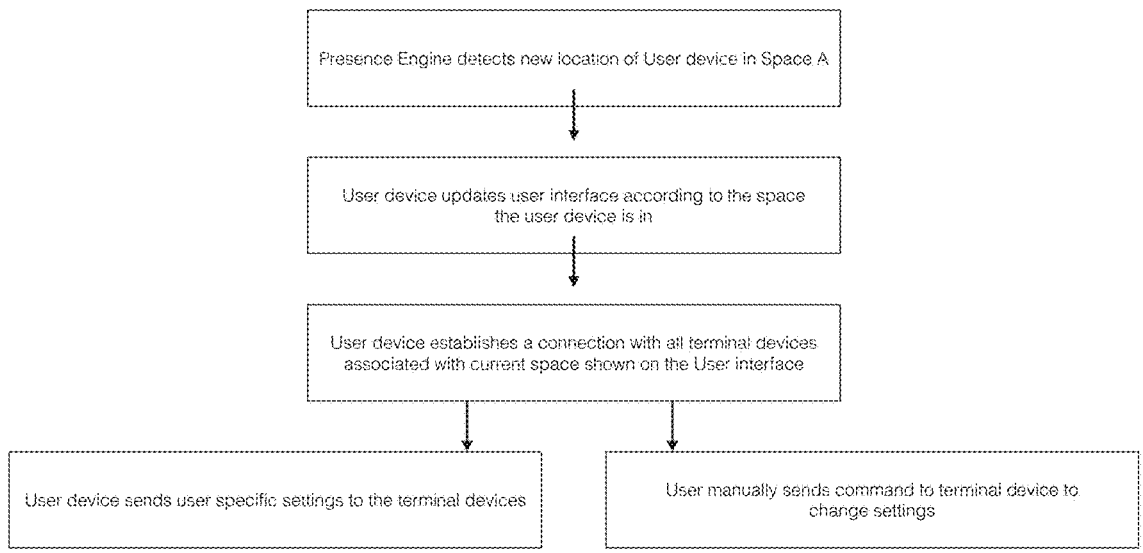
FIG. 16 is a process flow for depicting how the user device updates its user interface and settings of terminal devices after detecting a space change.

FIG. 16 illustrates the process of the user device detecting a room change and updating the user interface and terminal device settings. When the presence engine makes a decision on the new location of the user device, the user device updates its user interface to show what space the user device is in. Simultaneously, the user device establishes communication with all the terminal devices associated with that space. Once communication is established, the user device passes commands to the terminal devices that have settings to adjust based on the location of the user device. The user also has the option to manually adjust the settings of one of the terminal devices in the space without requiring to make another connection, therefore creates a very responsive reaction by the terminal device.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them.

Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination.

Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:
    for one or more user devices having one or more associated users, determining a current location of a user, wherein the current location is associated with a particular space of a plurality of different spaces, wherein the determining includes:
        computing a plurality of location results, wherein each location result is computed using a distinct process of a plurality of processes, and wherein a first process of the plurality of processes produces a lag result that represents location results for a past time, and wherein at least a second process of the plurality of processes produces a real-time result that represents location results for a current time, wherein the real-time result is characterized as having less confidence than the lag result; and
        evaluating the plurality of location results, including the lag result and real-time results, to determine a current space of the user,
    wherein the determining is performed by one or more of, a particular user device, a terminal device, or a server system.

2. The method of claim 1, wherein determining the current location of the user includes obtaining a plurality of data points.

3. The method of claim 2, further comprising performing calibration for the plurality of different spaces prior to obtaining the plurality of data points.

4. The method of claim 1, wherein the determining is based on votes generated for the location result computed for each of the plurality of processes.

5. The method of claim 1, wherein in response to determining the current location is a space of the plurality of different spaces that has not been calibrated, mapping the space.

6. The method of claim 1, wherein each process of the plurality of processes is trained, and wherein the training includes comparing a location of a user computed using a particular process with a location of the user computed using a baseline process.

7. The method of claim 6, wherein each process of the plurality of processes is associated with a particular weight, wherein the particular weight is determined based on a confidence of the computed location of the process determining during the training.

8. The method of claim 6, wherein the training includes monitoring one or more of RSSI data and accelerometer data for a user device.

9. The method of claim 1, wherein a process of the plurality of processes comprises generating scan tables of RSSI values between terminal devices over time.

10. The method of claim 9, wherein changes in the scan tables provide an indication that the calibration is incorrect due to movement of one or more terminal devices.

11. The method of claim 1, wherein a process of the plurality of processes comprises tracking user device movement in a space to predict whether the user device is going to leave the space.

12. The method of claim 11, wherein in response to a determination that the user device in a space is not moving includes initiating one or more low power modes for the process.

13. The method of claim 1, wherein a process of the plurality of processes comprises detecting signal dampening that exceeds a threshold value and using the detected signal dampening to provide an offset to a baseline process for determining user device location.

14. The method of claim 13, wherein user device orientation is used to interpret signal dampening.

15. The method of claim 14, wherein training the process includes performing machine learning to understand a relationship between user device orientation and how it effects incoming RSSI data.

16. The method of claim 1, wherein a process of the plurality of processes comprises using proximity and motion detectors to provide a vote on the location of a user when the user device is not present.

17. The method of claim 1, wherein one or more of the processes include a reactive specification that determines which user device of a plurality of user devices to provide a vote for as the location of a user.

18. The method of claim 1, wherein the determination of the current user location is performed on one or more of the user device, a remote server in communication with the user device, or one or more terminal devices located in respective spaces of the plurality of different spaces.

19. The method of claim 1, comprising adjusting one or more settings of one or more terminal devices based on the determination of the current location of the user.

20. The method of claim 1, further comprising:
    in response to determining the space corresponding to the current user location, establishing a connection with one or more terminal devices in the space; and
    presenting information on the user device indicating equipment coupled to respective terminal devices that are closest to the location of the user.

21. The method of claim 1, wherein the determined current location is used to determine a predicted change from one space to another space.

* * * * *